United States Patent
Uchida

(10) Patent No.: US 10,521,965 B2
(45) Date of Patent: Dec. 31, 2019

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventor: Hiroyuki Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/025,291

(22) Filed: Jul. 2, 2018

(65) Prior Publication Data

US 2019/0012838 A1 Jan. 10, 2019

(30) Foreign Application Priority Data

Jul. 4, 2017 (JP) .................................. 2017-131122

(51) Int. Cl.
| | | |
|---|---|---|
| G06T 19/00 | (2011.01) | |
| G06T 7/70 | (2017.01) | |
| G06T 11/00 | (2006.01) | |
| G06T 7/73 | (2017.01) | |

(52) U.S. Cl.
CPC ............ *G06T 19/006* (2013.01); *G06T 7/70* (2017.01); *G06T 7/73* (2017.01); *G06T 11/00* (2013.01); *G06T 2207/30204* (2013.01)

(58) Field of Classification Search
CPC .......... G06T 19/006; G06T 3/20; G06T 11/60
See application file for complete search history.

(56) References Cited

U.S. PATENT DOCUMENTS

| | | | | |
|---|---|---|---|---|
| 2004/0252137 | A1* | 12/2004 | Gelber ................... | G09B 29/10 345/629 |
| 2012/0075343 | A1* | 3/2012 | Chen ...................... | G09G 5/397 345/633 |
| 2014/0156364 | A1* | 6/2014 | Zalewski ............... | H04N 5/147 705/14.4 |
| 2014/0313223 | A1 | 10/2014 | Koga | |
| 2014/0375689 | A1 | 12/2014 | Handa | |
| 2015/0324645 | A1* | 11/2015 | Jang ........................ | G06F 3/012 345/633 |
| 2016/0260255 | A1* | 9/2016 | Bean ...................... | G06T 19/006 |

FOREIGN PATENT DOCUMENTS

| | | |
|---|---|---|
| JP | 2014-215646 | 11/2014 |
| JP | 2015-5088 | 1/2015 |

* cited by examiner

*Primary Examiner* — Jeffery A Brier
(74) *Attorney, Agent, or Firm* — Fujitsu Patent Center

(57) ABSTRACT

An information processing apparatus configured to execute an augmented reality (AR) processing, the information processing apparatus includes a display device, and a processor configured to acquire image data, detect an AR marker included in the image data, identify a content corresponding to the AR marker, and position information indicating a display position of the content in the display device, determine whether a part of the content is not within a display area of the display device, when it is determined that the part of the content is not within a display area of the display device, determine, based on attribute information of the content, whether the content is to be displayed on the display device, and when it is determined that the part of the content is to be displayed on the display device, display the content including the part of the content on the display device.

10 Claims, 24 Drawing Sheets

FIG. 5

| | | | | | |
|---|---|---|---|---|---|
| 114 AR MARKER INFORMATION | | ▞ | | | |
| 115 CONTENT INFORMATION | TURN RIGHT VALVE TO RIGHT | SET CENTER METER TO 0 | SET TEMPERATURE TO 26°C | TURN LEFT VALVE TO LEFT | REMARK BE SURE TO WEAR HEAT-RESISTANT GLOVE AT THE TIME OF TASK |
| 116 POSITION INFORMATION | ABOVE AR MARKER | LEFT OF AR MARKER | RIGHT OF AR MARKER | BELOW AR MARKER | DIAGONALLY UPPER RIGHT OF AR MARKER |
| 117 IMPORTANT DEGREE INFORMATION | × | × | × | × | ○ |

111

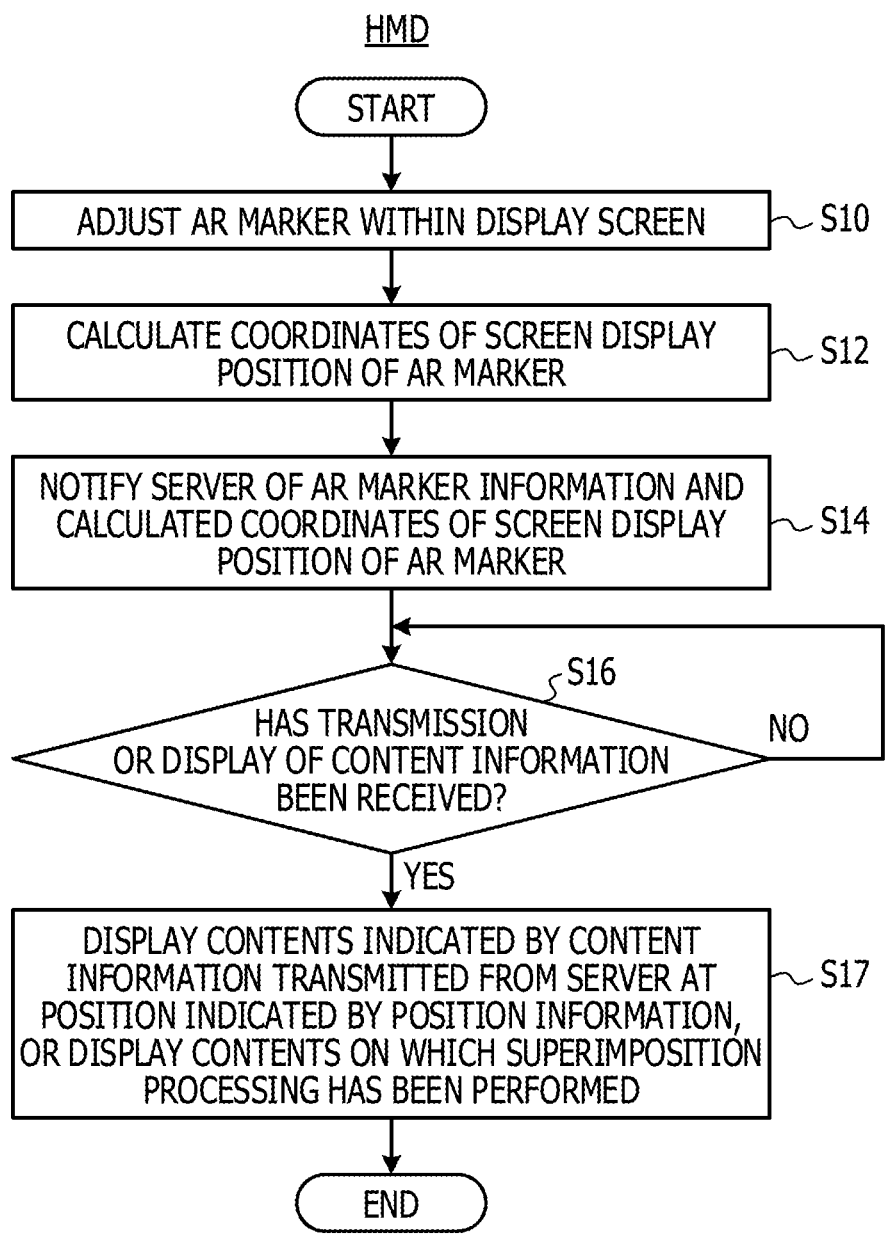

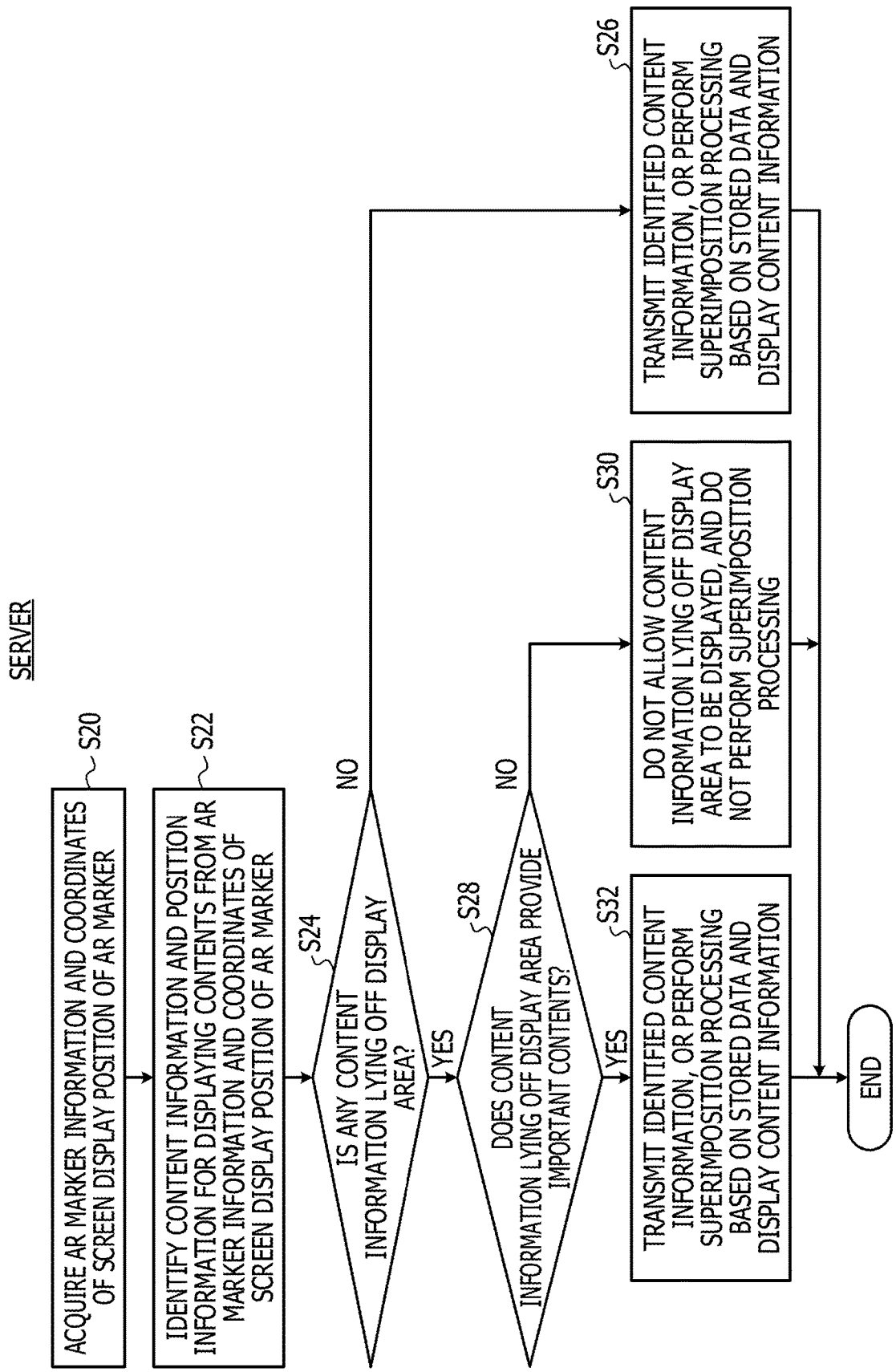

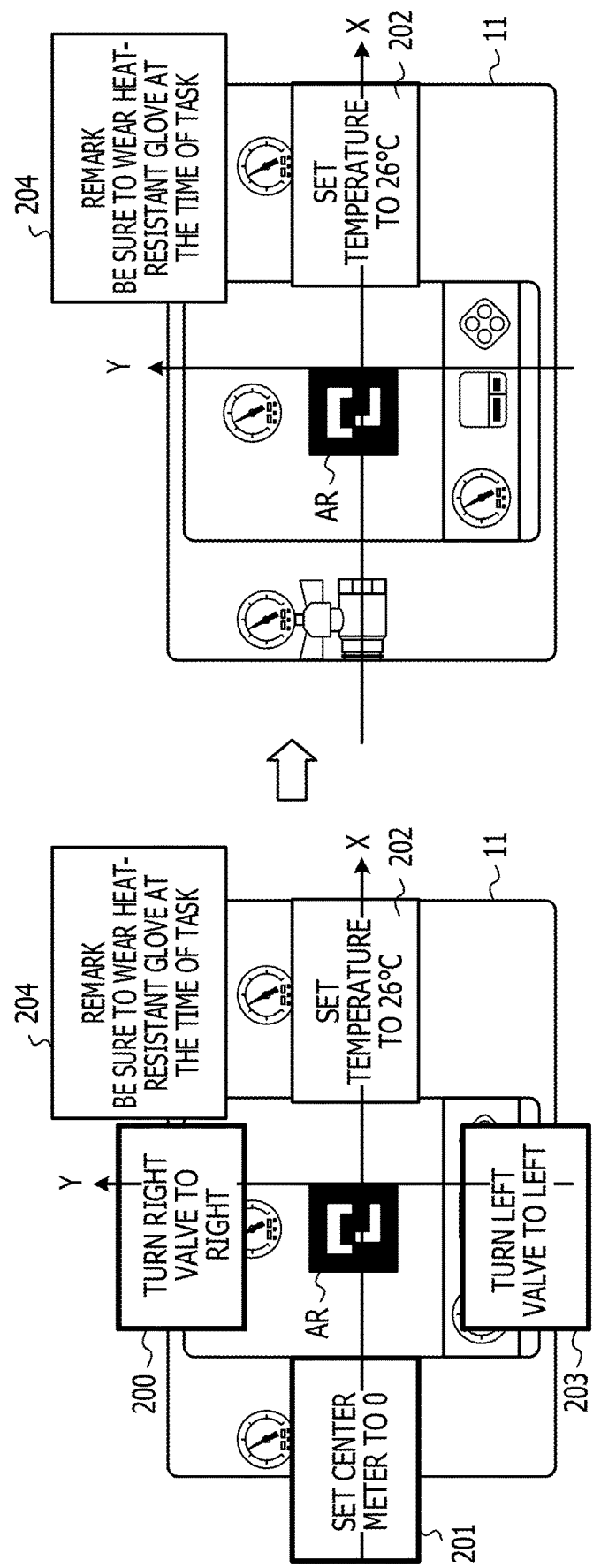

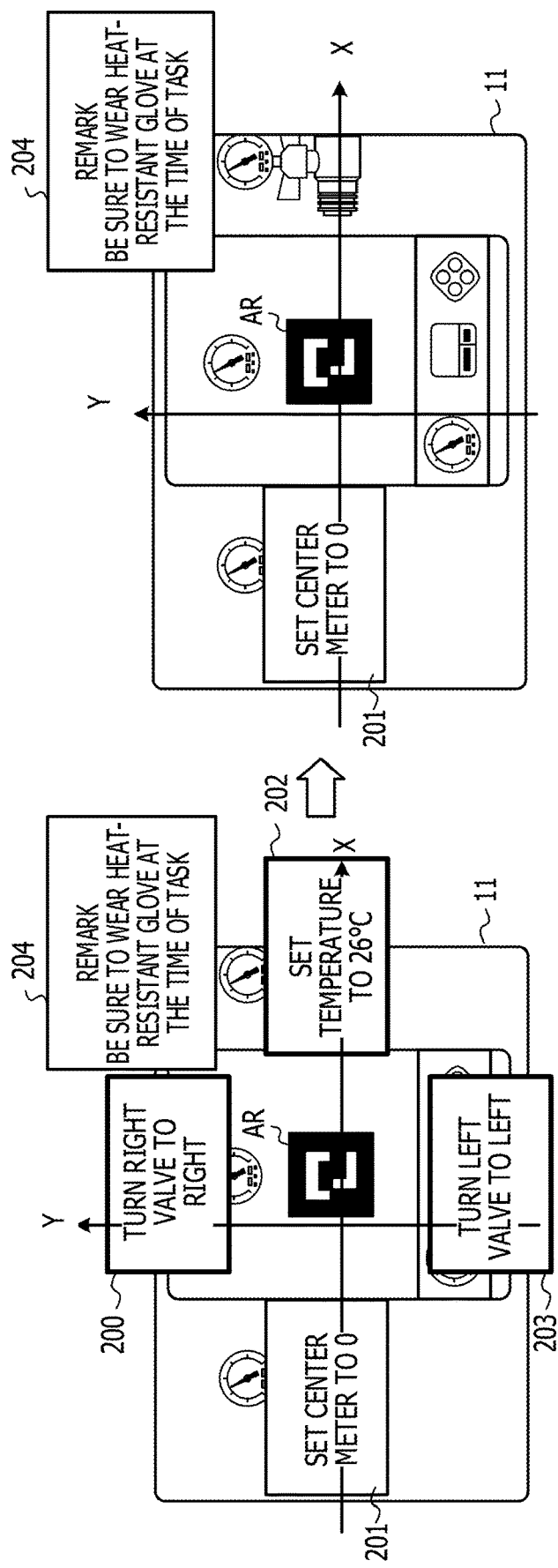

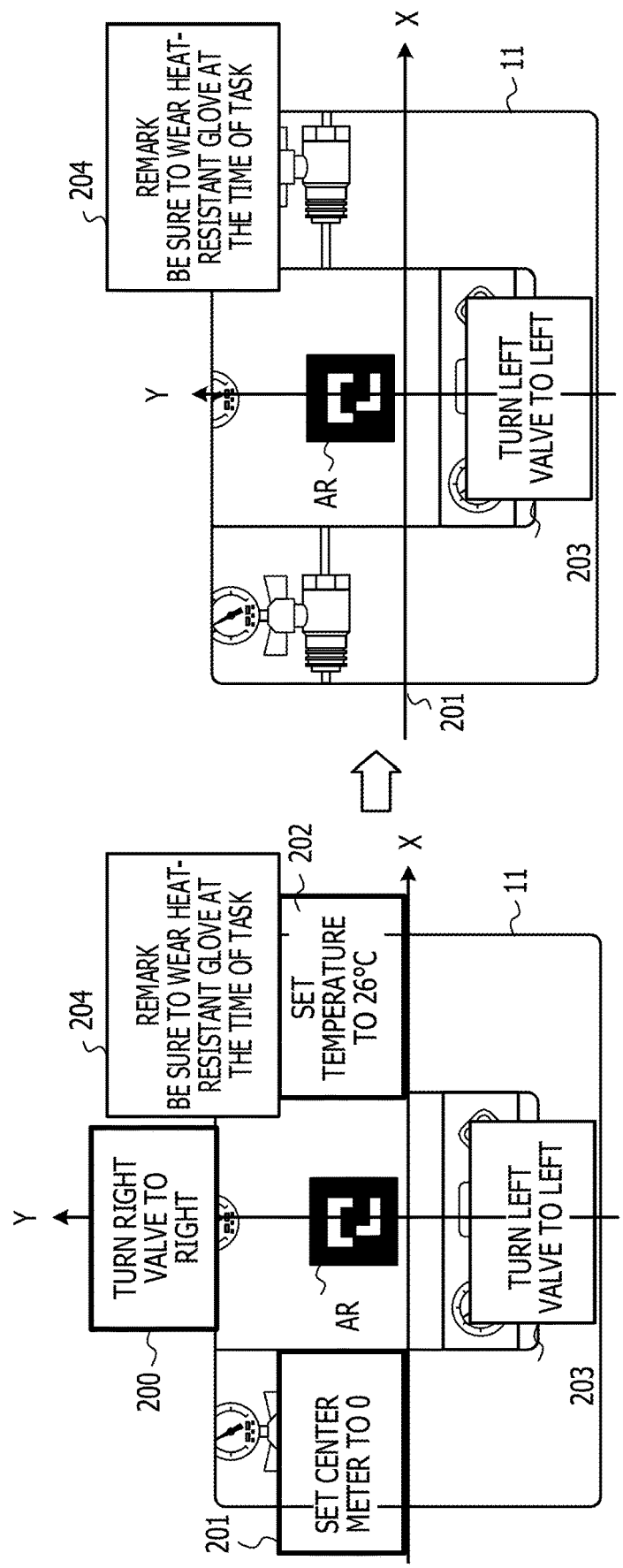

FIG. 10

| CPU | UPPER LEFT COORDINATES | LOWER RIGHT COORDINATES |
|---|---|---|
| AREA a | $(X_{a1}, Y_{a1})$ | $(X_{a2}, Y_{a2})$ |
| AREA b | $(X_{b1}, Y_{b1})$ | $(X_{b2}, Y_{b2})$ |
| ⋮ | ⋮ | ⋮ |

112

FIG. 16A
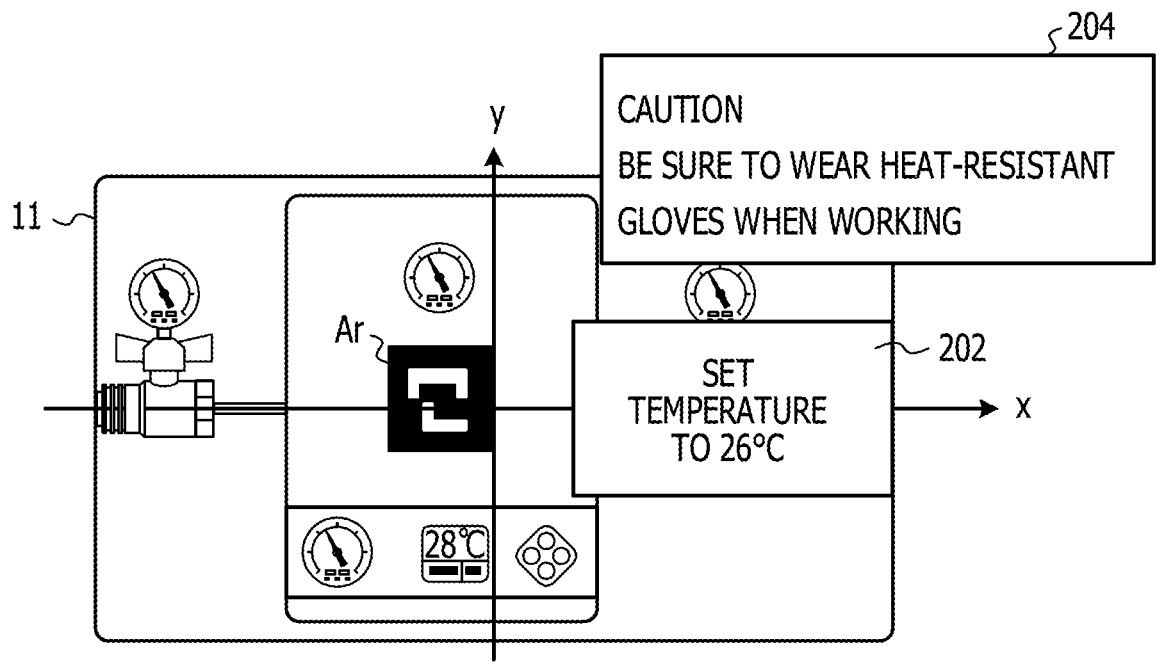
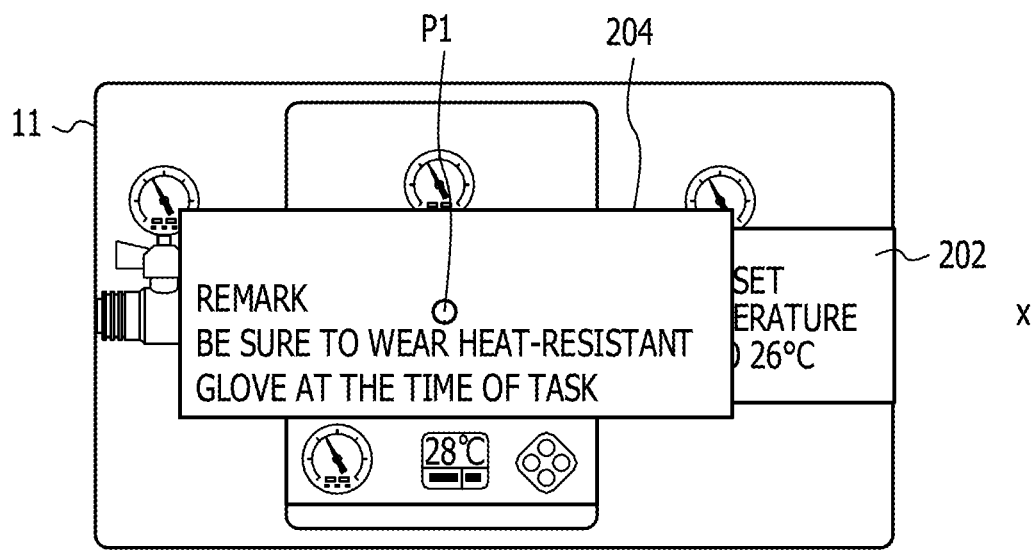

FIG. 16B
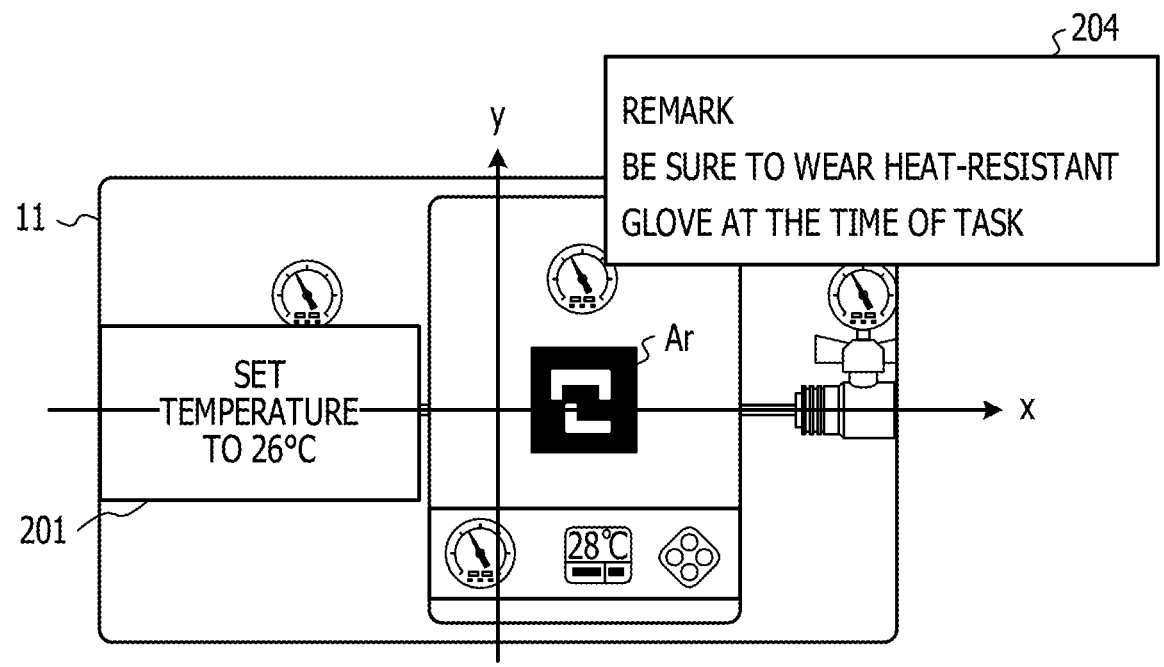
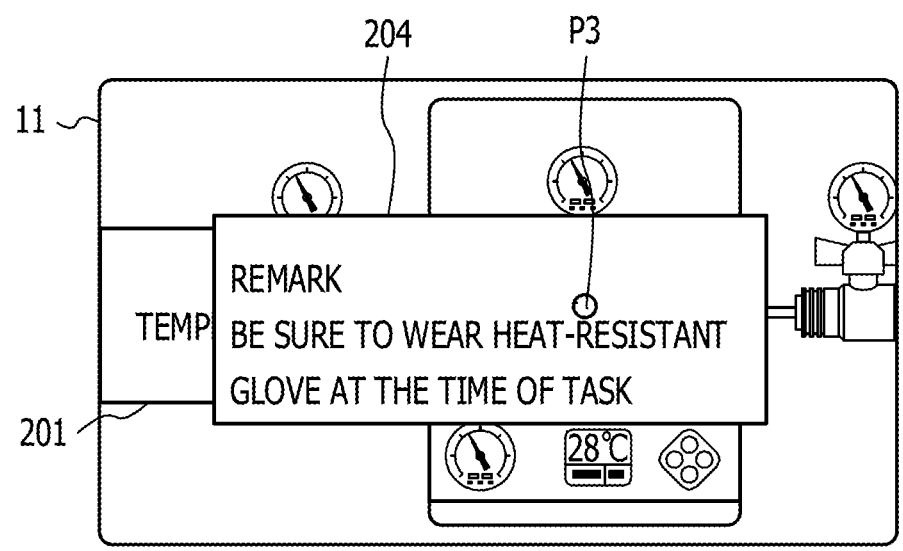

FIG. 16C
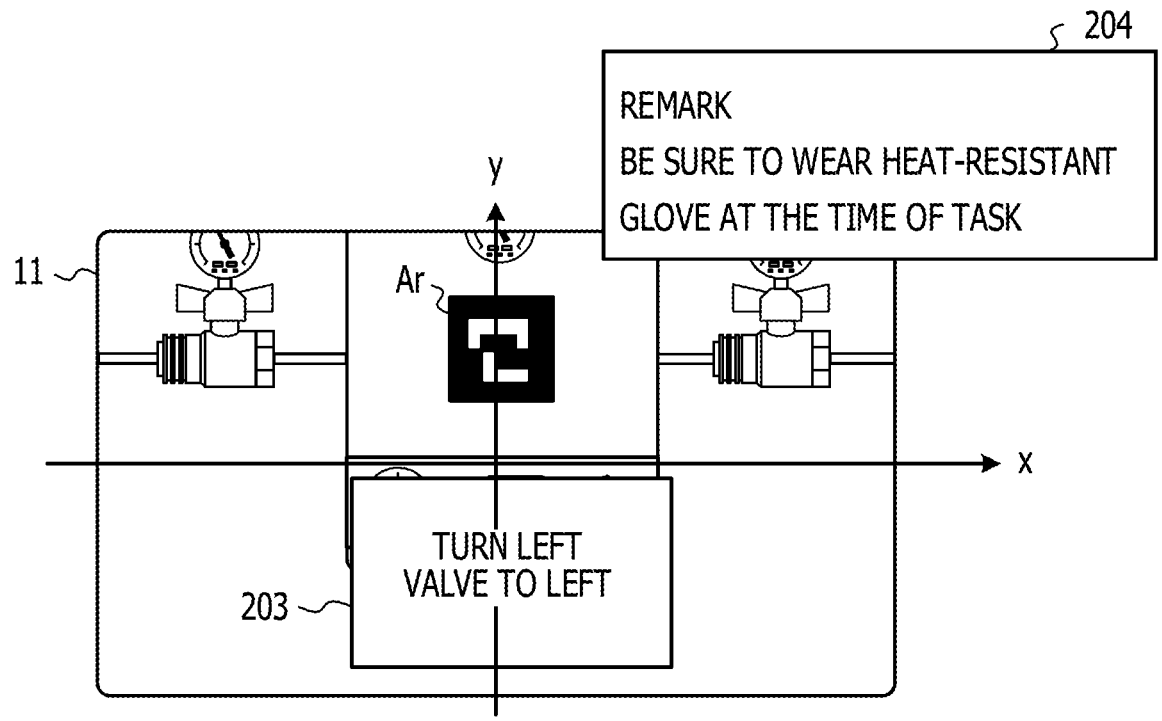
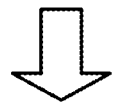
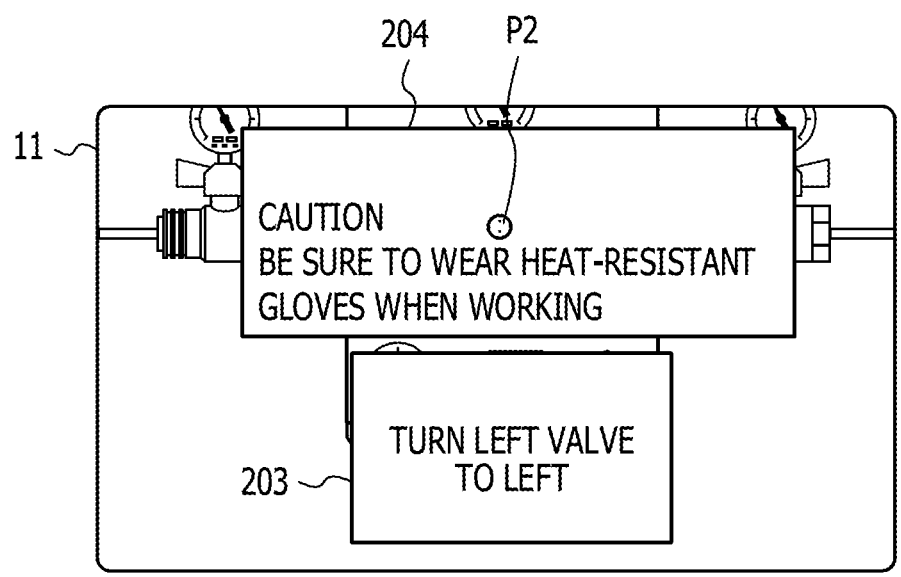

FIG. 16D
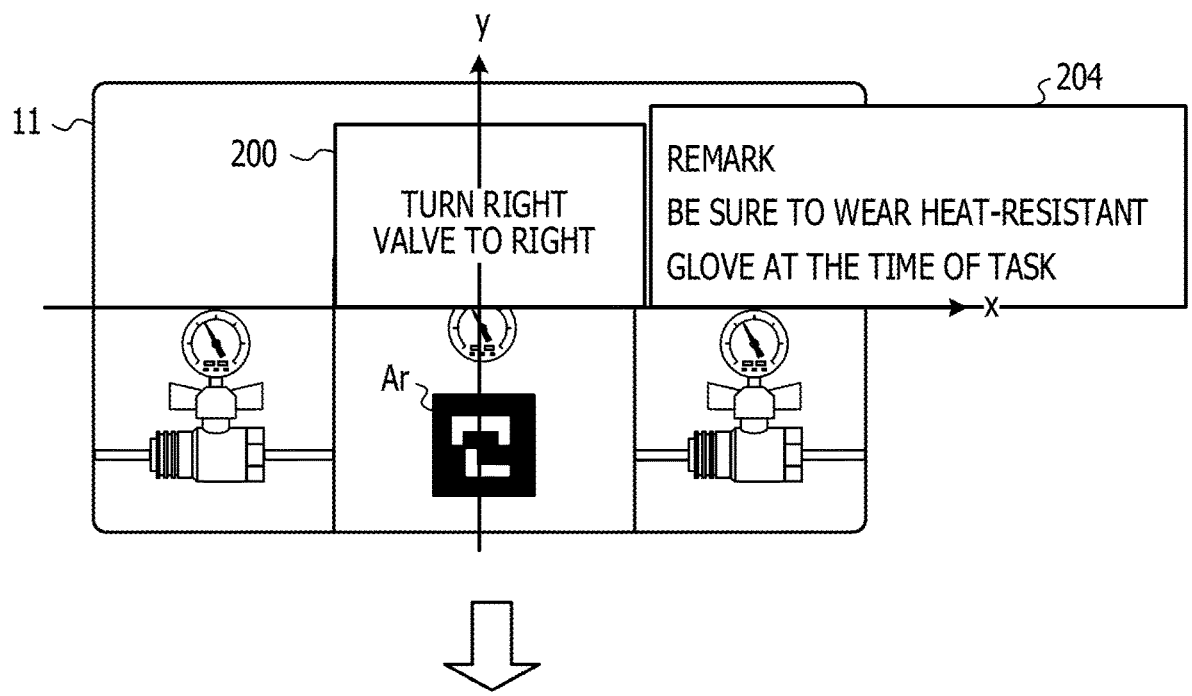
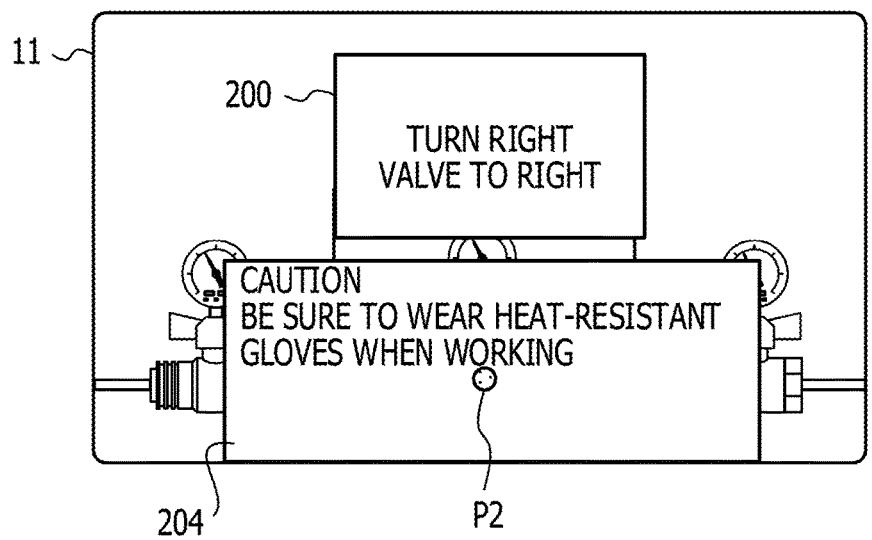

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-131122, filed on Jul. 4, 2017, the entire contents of which are incorporated herein by reference.

FIELD

The embodiments discussed herein are related to an information processing apparatus, a method and a non-transitory computer-readable storage medium.

BACKGROUND

The function of augmented reality (AR) is known in which a reference object such as an AR marker is used, and the reference object is placed within the finder screen of a camera, and virtual contents according to the reference object are thereby displayed with superimposed on a display under the real environment.

When multiple contents are displayed for one AR marker superimposed on a display under the real environment, the data volume increases, as the number of contents increases. For this reason, when processing of superimposing the multiple contents on a display under the real environment is performed on the side of a server and the multiple contents are displayed on the side of a display device, a low communication speed causes a delay between the display under the real environment in a screen on the display device side, and the display of the multiple contents to be superimposed.

To cope with this, multiple contents associated with an AR marker may be downloaded beforehand in the display device so that communication delay does not occur. However, in this case, processing of superimposing the multiple contents has to be performed on the display device side, and thus the power consumption may increase.

Also, when multiple contents are displayed superimposed on a display under the real environment, depending on the amount of information of a content, the content may lie off the screen of the display device, and part of the information on the content is missing, and it is difficult to view the content. When a content is displayed in a reduced size to avoid missing of content information, displayed details of the content are difficult to view.

Thus, Japanese Laid-open Patent Publication No. 2014-215646 discloses a method in which multiple scenarios each including a combination of contents to be desirably viewed are separately prepared, and a content to be desirably displayed is switched by a combination of a reference object and a scenario because displaying all of multiple contents for a reference object causes a difficult to see configuration. Also, Japanese Laid-open Patent Publication No. 2015-5088 discloses a method in which a direction, in which a reference object enters a display area, is detected, and display contents are switched and displayed. Related techniques are disclosed in, for example, Japanese Laid-open Patent Publication Nos. 2014-215646 and 2015-5088.

SUMMARY

According to an aspect of the invention, an information processing apparatus configured to execute an augmented reality (AR) processing, the information processing apparatus includes a display device, and a processor coupled to the display device and configured to acquire image data, detect an AR marker included in the image data, identify a content corresponding to the AR marker, and position information indicating a display position of the content in the display device, determine, based on the content and the position information, whether a part of the content is not within a display area of the display device, when it is determined that the part of the content is not within a display area of the display device, determine, based on attribute information of the content, whether the part of the content is to be displayed on the display device, and when it is determined that the content is to be displayed on the display device, display the content including the part of the content on the display device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table illustrating an example of AR content DB according to an embodiment.

FIG. 6 is a flowchart illustrating an example of display control processing (on the HMD side) according to the first embodiment.

FIG. 7 is a flowchart illustrating an example of display control processing (on the server side) according to the first embodiment.

FIGS. 8A, 8B, 8C, and 8D are each an illustration depicting a display example of the display control processing according to the first embodiment.

FIG. 10 is a table illustrating an example display area table according to a second embodiment.

FIGS. 16A, 16B, 16C, and 16D are each an illustration depicting a display example of the display control processing according to the second embodiment.

DESCRIPTION OF EMBODIMENTS

The method of disclosed in Japanese Laid-open Patent Publication No. 2014-215646 has a burdensome task of selecting and performing a scenario in addition to detecting a reference object. Also, a scenario to be performed may be mistaken, and thus the operation becomes complicated, and the power consumption increases. Also, in the method disclosed in Japanese Laid-open Patent Publication No. 2015-5088, a direction, in which a reference object enters a frame, has to be checked before the reference object is detected, and the power consumption increases accordingly. In addition, it is desirable to store which display data is displayed in the direction in which the reference object enters a frame.

Hereinafter, embodiments of the present disclosure will be described with reference to the accompanying drawings. It is to be noted that in the description and the drawings, components having substantially the same functional configuration are labeled with the same symbol, and redundant description will be omitted.

[Display Control System]

Figure 1:
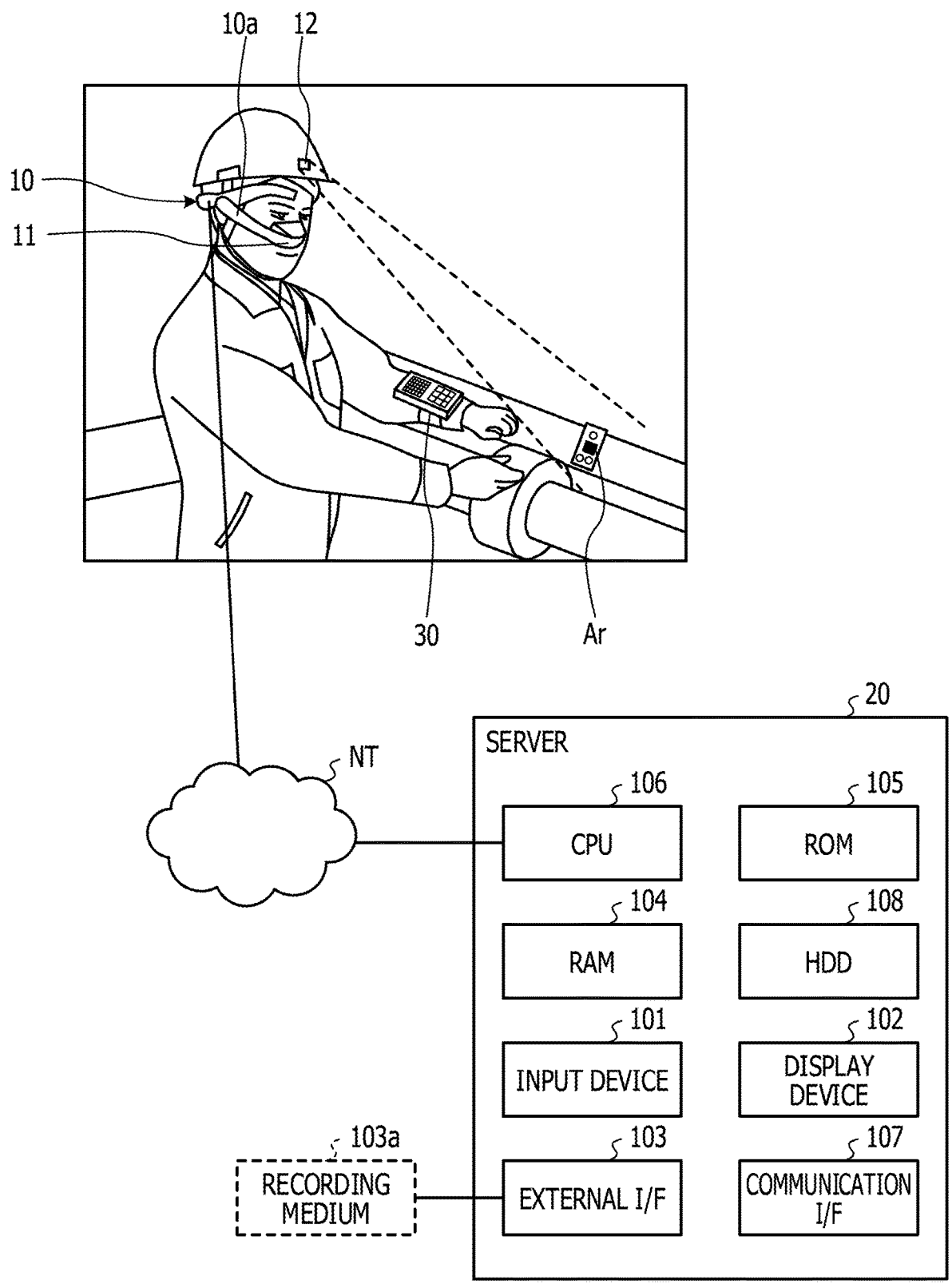
FIG. 1 is a diagram illustrating an example configuration of a display control system and a display control device according to an embodiment.

First, an example configuration of a display control system according to an embodiment of the present disclosure will be described with reference to FIG. 1. FIG. 1 illustrates an example configuration of the display control system according to the embodiment. The display control system according to the embodiment has a head mount display (hereinafter referred to as a "HMD 10") and a server 20. The head mount display (HMD) 10 and the server 20 are coupled via a network NT.

The HMD 10 has a configuration in which a main body 10a, a display 11, and a camera 12 are mounted on the helmet of a worker. The HMD 10 is an example of a wearable device of a human body mounting type, and may be a face mount display (FMD) or the like. Although the HMD 10 will be described by way of example in this embodiment, a device to which the present disclosure is applicable is not limited to a wearable device and may be a device having a display unit such as the display 11 as an example. For instance, instead of the HMD 10, an information processing device such as a smartphone, a tablet terminal, or a personal computer may be used. The camera 12 is an example of an imaging device. The cameras 12 may be a visible camera, an infrared camera or the like.

The HMD 10 has a communication function, and transmits image information on a reference object such as an AR marker Ar captured by the camera 12, and screen display position information (coordinates) on the reference object to the server 20 via the network NT. The server 20 has the function of augmented reality (hereinafter referred to as "AR") that displays virtual contents according to a reference object, superimposed on a display under the real environment. The server 20 is an example of a display control device that has the function of AR.

The server 20 identifies content information which is display data corresponding to an AR marker Ar and information on position at which contents are displayed, and transmits the identified content information and position information to the HMD 10, or performs superimposition processing on specific contents at a predetermined display position based on the identified content information and position information. The HMD 10 displays the received content information at a specific position of the display 11 indicated by the position information, or displays the contents on which superimposition processing has been performed. Thus, for instance, as illustrated in the example in FIG. 2A, contents 201, 202 corresponding to the AR marker Ar are displayed superimposed on a display under the real environment in the display area (the screen of the display 11) of the display 11.

Returning to FIG. 1, an example of the hardware configuration of the server 20 will be described. The server 20 has an input device 101, a display device 102, an external I/F 103, a random access memory (RAM) 104, a read only memory (ROM) 105, a central processing unit (CPU) 106, a communication I/F 107, and a hard disk drive (HDD) 108.

The input device 101 includes a keyboard, and a mouse, and is used to input information to the server 20. The display device 102 includes a display such as a liquid crystal display (LCD) monitor, a printer, and a cathode ray tube (CRT), and outputs various types of information. The communication I/F 107 is an interface that couples the server 20 to the network NT. Thus, the server 20 performs data communication with the HMD 10 and other devices via the communication I/F 107.

The HDD 108 is a non-volatile storage device that stores programs and data. The stored programs and data include a basic software that controls the entire server 20 and application software. For instance, various type of databases and programs may be stored in the HDD 108.

The external I/F 103 is an interface with external devices. The external devices include a recording medium 103a. Thus, the server 20 reads and/or writes data from and to the recording medium 103a via the external I/F 103.

The ROM 105 is a non-volatile semiconductor memory. The ROM 105 stores a base program such as network setting program and data. The RAM 104 is a non-volatile semiconductor memory that temporarily holds programs and data. The CPU 106 is an arithmetic device that achieves the control of the entire device and the provided display control function by loading programs and data from a storage device such as the HDD 108 and the ROM 105 to the RAM 104, and performing processing.

In this configuration, in the server 20 according to the embodiment, the CPU 106 achieves a function such as AR provided in the server 20 by executing a program stored in, for instance, the RAM 104 or the HDD 108. Thus, it is possible to display contents according to the AR marker Ar superimposed on a display under the real environment, at a specific position of the display 11 of the HMD 10.

Figure 2A:
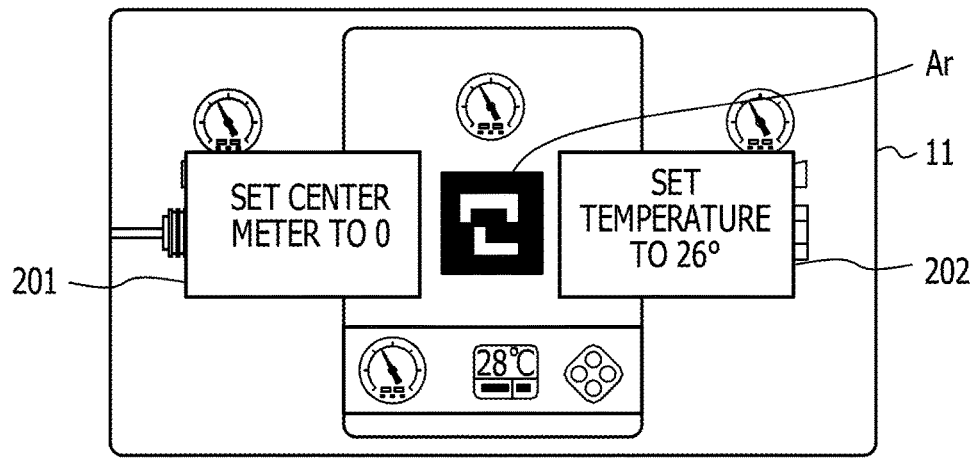
FIGS. 2A, 2B, and 2C illustrate an example display screen using an AR function according to an embodiment.

As a consequence, as illustrated in FIG. 2A, the contents superimposed on a display under the real environment allows a worker to perform a task while looking at an operation procedure to be performed during the task or a manual, and thus the task may be smoothly performed. It is to be noted that a worker may be equipped with a keyboard 30 illustrated in FIG. 1, and may input desired information during a task.

Figure 3:
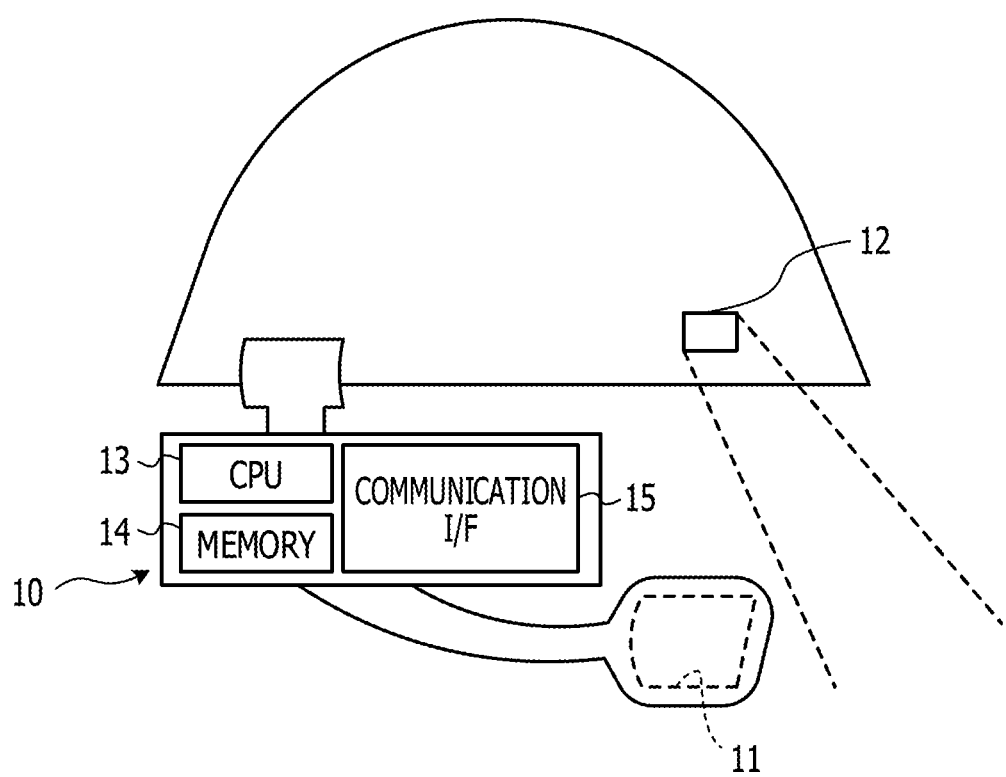
FIG. 3 is an illustration depicting an example of another configuration of a display control device according to an embodiment.

As illustrated in FIG. 3, instead of the server 20, the HMD 10 may achieve the above-described function of the server 20. In this case, the server 20 does not have to be provided, and for instance, the HMD 10 has the CPU 13, the memory 14, and the communication I/F 15 in addition to the display 11 and the camera 12.

With this configuration, in the HMD 10 according to the embodiment, the communication I/F 15 receives an image of the AR marker Ar from the camera 12. The CPU 13 identifies AR marker Ar information and the coordinates of the screen display position of the AR marker Ar from the image of the AR marker Ar. The CPU 13 achieves a function such as AR provided in the HMD 10 by executing a program stored in the memory 14 based on the identified AR marker Ar information and the coordinates of the screen display position of the AR marker Ar. Thus, it is possible to display contents according to the AR marker Ar superimposed on a display under the real environment, at a specific position of the display 11 of the HMD 10. In the example of FIG. 3, the HMD 10 is an example of a display control device that has the AR function of displaying contents according to the AR marker Ar superimposed on a display under the real environment.

Figure 2B:
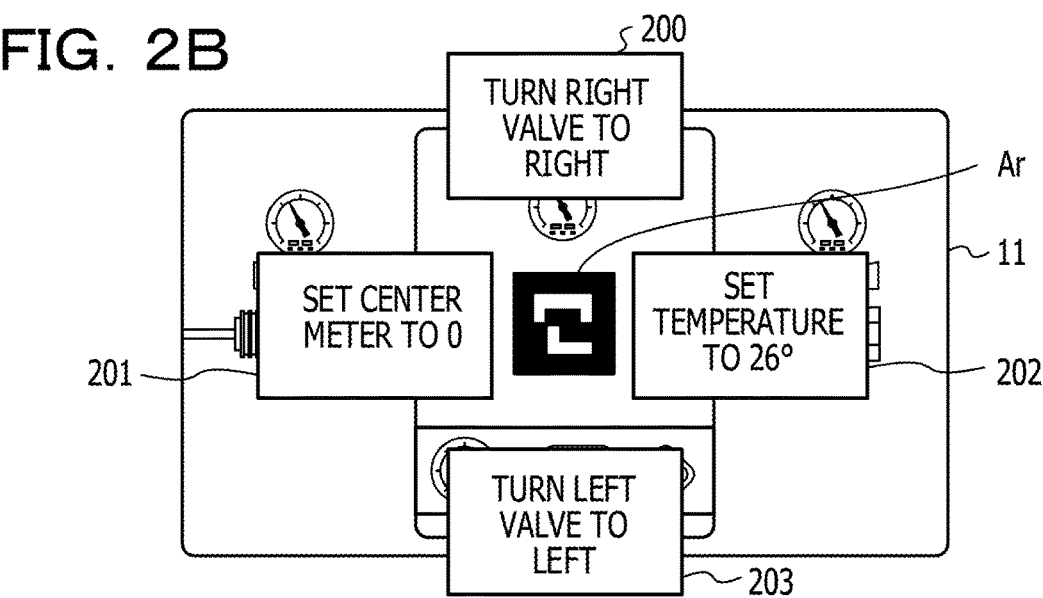

As in the example illustrated in FIG. 2B, when four contents 200, 201, 202, and 203 corresponding to the AR marker Ar are displayed superimposed, two contents 200, 203 may not be contained in the display area of the display 11. In this case, part of the contents 200, 203 within the display area is displayed, and part of the contents 200, 203 out of the display area is not displayed, thus an operation procedure, which is an example of the contents, is not easy to read.

Also, as the number of contents corresponding to the AR marker Ar increases, the load of display control processing of the contents increases, and the power consumption increases as well as the area in which contents are superimposed and displayed is increased and the screen is difficult to see.

Figure 2C:
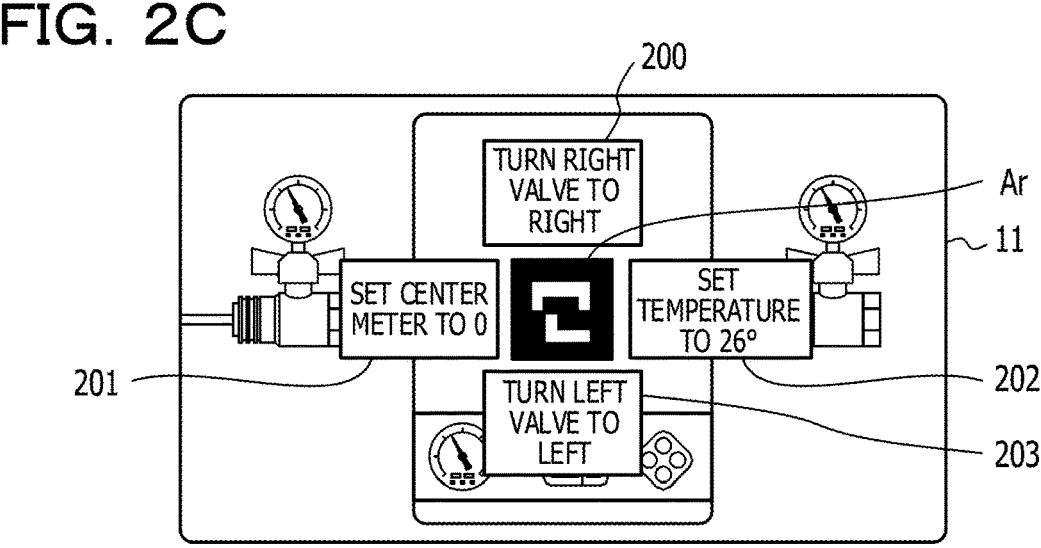

To cope with this, when the display of the contents 200, 201, 202, and 203 corresponding to the AR marker Ar is reduced as illustrated in FIG. 2C, an operation procedure is not easy to read, and a task may not be smoothly performed.

Thus, in the embodiment, only the contents indicated by desirable content information are displayed superimposed according to the display position of contents within the display area of the AR marker, contents determined to be undesirable are not allowed to be displayed. Consequently, with the display control method according to the embodiment, it is possible to reduce the power consumed for displaying the display data. Hereinafter, the embodiments of the display control device and the display control processing will be described in the order of the first embodiment and the second embodiment.

First Embodiment

[Functional Configuration]

Figure 4:
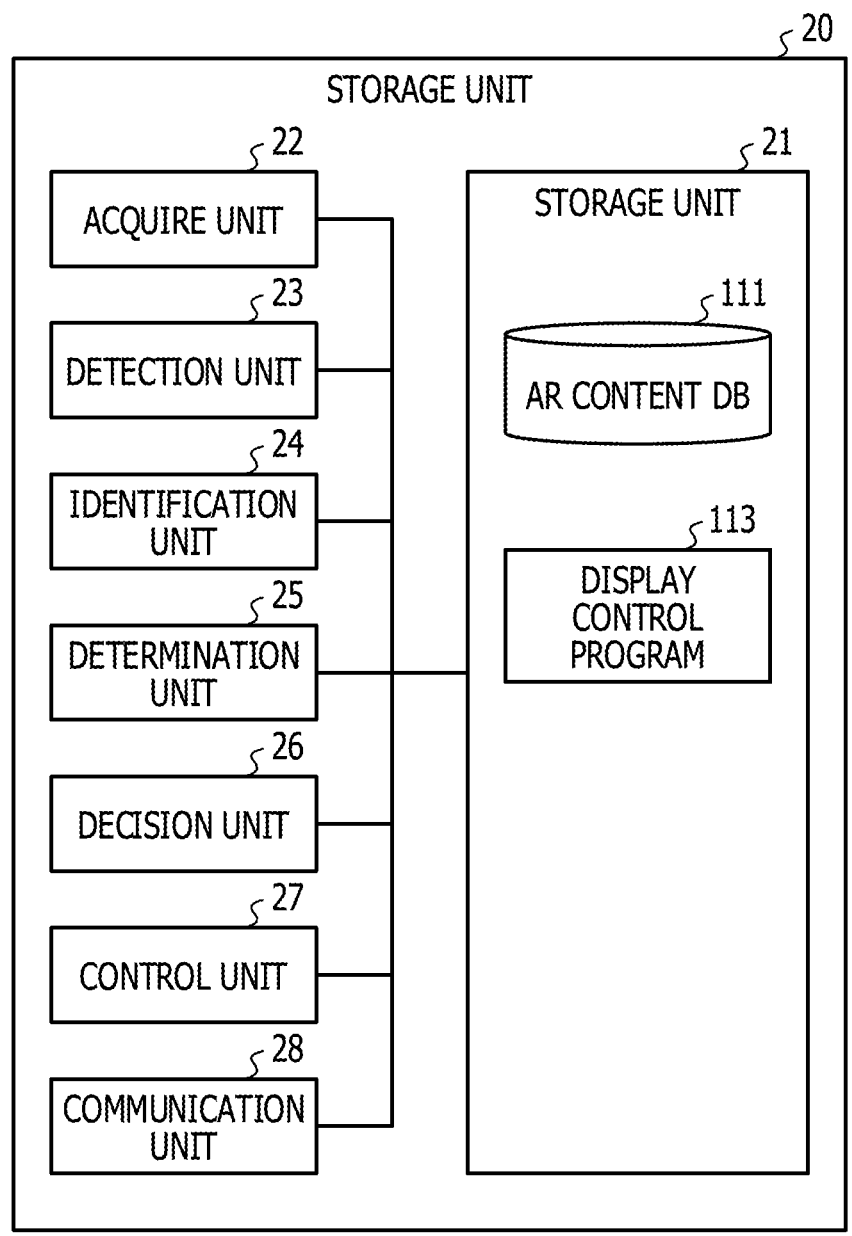
FIG. 4 is a diagram illustrating an example functional configuration of a server according to a first embodiment.

First, as an example of the display control device, an example functional configuration of the server 20 according to a first embodiment will be described with reference to FIG. 4. It is to be noted that the functional configuration of the HMD 10 of FIG. 3, which is another example of the display control device, is the same as the functional configuration of the server 20, and thus, a description is omitted here.

The server 20 has a storage unit 21, an acquisition unit 22, a detection unit 23, an identification unit 24, a determination unit 25, a decision unit 26, a control unit 27, and a communication unit 28. The storage unit 21 stores databases, programs, and various types of data, such as an AR content database (DB) 111 and a display control program 113.

FIG. 5 illustrates an example of AR content DB according to an embodiment. The AR content DB 111 is a database that stores pieces of information: content information 115, position information 116, and important degree information 117 for each AR marker information 114. The number of pieces of the content information 115 corresponding to the AR marker information 114 may be one or may be multiple. The position information 116 indicates a display position on the screen in which the content information 115 is displayed in the display area. The position information 116 may indicate coordinates spaced away from the AR marker by a predetermined distance. The important degree information 117 indicates whether or not the contents indicated by the content information 115 is important.

The display control program 113 is a program for executing display including the AR function by the CPU 106.

The acquisition unit 22 acquires the image of an AR marker Ar captured by the camera 12. The detection unit 23 detects the AR marker Ar from the acquired image. The identification unit 24 refers to the AR content DB 111, and identifies the content information 115 associated with the AR marker Ar in the detected image, and the position information 116 for displaying the contents indicated by the content information 115.

The determination unit 25 determines whether or not the display data lies off the display area of the display unit. The determination unit 25 determines which part of the contents (display data) corresponds to the inside of the display area of the display unit, and the other part of the display data corresponds to the outside of the display area of the display unit based on the identified content information 115 and position information 116. It is to be noted that the inside of the display area of the display 11 is a first section which is to be displayed via the display 11. The outside of the display area of the display 11 is a second section which is not to be displayed via the display 11.

For instance, in the case of the example illustrated in FIG. 2B, the contents 201, 202 are included in the display area of the display 11, and does not include the second section which is not to be displayed via the display 11. On the other hand, the contents 200, 203 are partially out of the display area of the display 11, and include the first section which is to be displayed via the display 11, and the second section which is not to be displayed via the display 11.

When the contents (display data) includes the first section and second section, the decision unit 26 decides whether or not the first section is displayed on the display 11, based on the attribute information on identified contents. When the display data lies off the display area, the decision unit 26 decides whether or not the display position of the display data is changed according to the attribute information on the display data so that part of the display data out of the display area is reduced. When the display position of the display data is changed, the display size of the display data is maintained. For instance, when the attribute information on the identified contents indicates that reference importance is satisfied, the decision unit 26 displays the first section in the display 11. When the attribute information on the identified contents indicates that the reference importance is not satisfied, the decision unit 26 does not allow the first section to be displayed in the display 11. Whether or not the contents are important may be determined by the important degree information 117 of the AR content DB 111. The important degree information 117 is an example of attribute information on contents.

The communication unit 28 transmits and receives information such as the AR marker information, the content information, and the position information to and from the HMD 10. The control unit 27 controls the entire server 20.

It is to be noted that all the units of the acquisition unit 22, the detection unit 23, the identification unit 24, the determination unit 25, the decision unit 26, and the control unit 27 are achieved by processing which is executed by the CPU 106 caused by the display control program 113. The function of the communication unit 28 may be achieved, for instance, by the communication I/F 107.

The function of the storage unit 21 may be achieved, for instance, by the RAM 104, the ROM 105, the HDD 108 or a storage device on the Cloud coupled to the server 20 via the network NT.

[Display Control Processing]

Figure 8D:
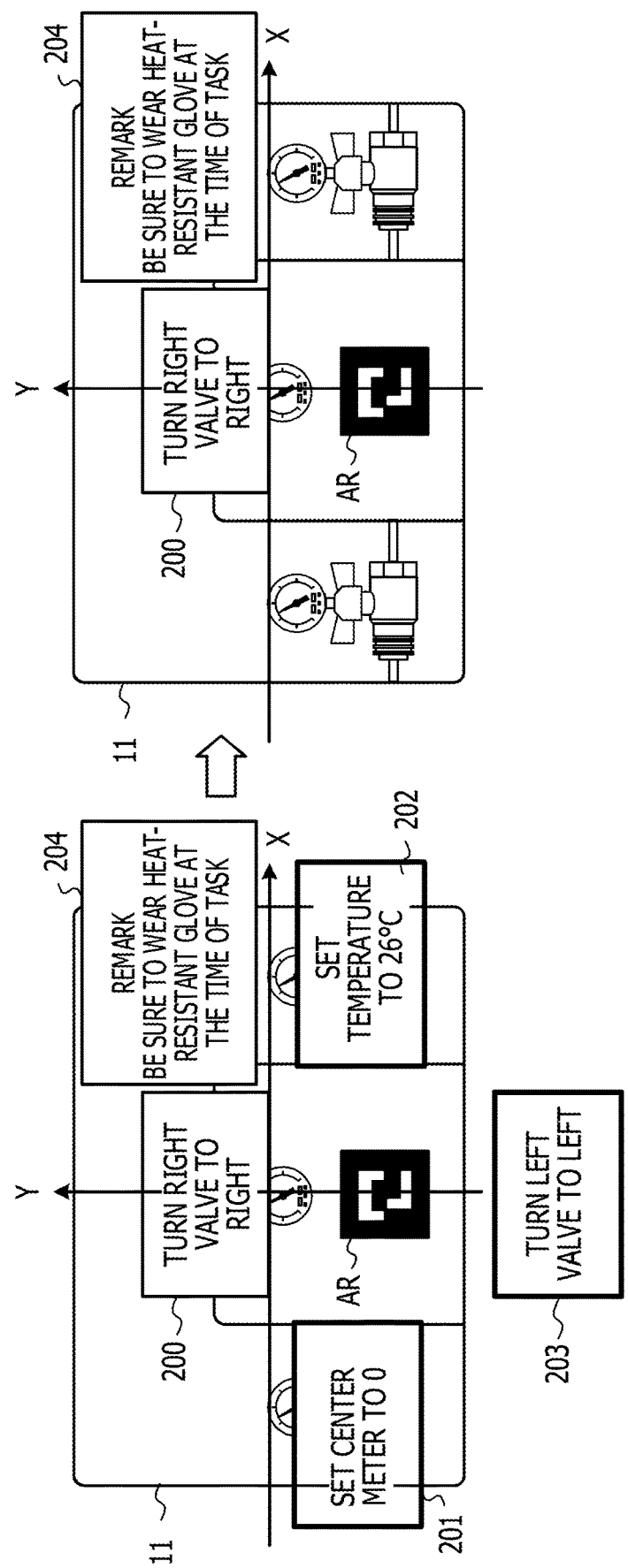

Next, an example of display control processing according to the first embodiment will be described with reference to FIGS. 6 to 8. FIG. 6 is a flowchart illustrating an example of the display control processing (on the HMD side) according to the first embodiment. FIG. 7 is a flowchart illustrating an example of the display control processing (on the server side) according to the first embodiment. FIG. 8 illustrates a display example of the display 11 of the HMD 10 displayed by the display control processing according to the first embodiment.

In the processing, first, as illustrated in FIG. 6, on the HMD 10 side, the camera 12 adjusts the AR marker within the display screen, and captures an image of the AR marker (step S10). Next, the HMD 10 calculates the coordinates of the screen display position of the AR marker (step S12). Next, the HMD 10 notifies the server 20 of AR marker information and the calculated coordinates of the screen display position of the AR marker (step S14).

In the server 20, as illustrated in FIG. 7, the communication unit 28 receives the information transmitted from the HMD 10 (step S20), and the acquisition unit 22 acquires the AR marker information and the coordinates of the screen display position of the AR marker. When the detection unit 23 detects AR marker Ar based on the AR marker information and the coordinates of the screen display position of the AR marker, the identification unit 24 refers to the AR content DB 111, and identifies content information associated with the AR marker Ar included in a detected image, and position information indicating the position at which the contents are displayed (step S22).

Next, the determination unit 25 determines whether any content information lies off the display area of the display 11 (step S24). When the determination unit 25 determines that no content information lies off the display area of the display 11, the decision unit 26 transmits the identified content information, or performs superimposition processing based on stored data, and displays the content information on the display 11 of the HMD 10 (step S26). For instance, when no content lies off the display area of the display 11 as illustrated in FIG. 2A, the processing in step S26 is performed, and thus the display data of the contents 201, 202 indicated by specific content information 115 is displayed superimposed under the real environment at the position indicated by the position information 116 on the display 11 of the HMD 10.

Returning to FIG. 7, on the other hand, when it is determined in step S24 that some content information lies off the display area of the display 11, the determination unit 25 determines whether or not the content information lying off the display area provides important contents (step S28).

When the determination unit 25 determines that the content information lying off the display area provides unimportant contents, the decision unit 26 does not allow the content information lying off the display area to be displayed, and does not perform superimposition processing (step S30). For instance, when the contents 200, 203 are present which lie off the display area of the display 11 as illustrated in FIG. 2B, and the contents 200, 203 are not important, the contents 200, 203 are not allowed to be displayed in the display area. As a consequence, as illustrated in FIG. 2A, only the contents 201, 202 are displayed on the display 11.

Returning to FIG. 7, on the other hand, when the determination unit 25 determines in step S28 that the content information lying off the display area provides important contents, the decision unit 26 transmits the identified content information to the HMD 10, or performs superimposition processing based on stored data, and displays the content information on the display 11 of the HMD 10 (step S32).

Returning to FIG. 6, the HMD 10 determines whether transmission or superimposition display of the content information has been received from the server 20 (step S16). When transmission or superimposition display of the content information has been received from the server 20, the HMD 10 displays the contents indicated by the content information transmitted from the server 20 at the position indicated by the position information, or displays the contents on which superimposition processing has been performed (step S17), and completes the processing.

Consequently, for instance, as illustrated in FIGS. 8A to 8D, of the contents lying off the display area of the display 11, unimportant contents are not allowed to be displayed, and important contents are displayed. Specifically, in the left example of FIG. 8A, the content 202 are in the display area of the display 11, and the contents 200, 201, 203, and 204 lie off the display area of the display 11. In this case, as illustrated on the right of FIG. 8A, of the contents lying off the display area, important content 204 are not disallowed to be displayed, and the content 204 along with the content 202 in the display area are displayed on the display 11. The other contents 200, 201, and 203 lying off the display area are not allowed to be displayed. Similarly, in the examples of FIGS. 8B to 8D, of the contents lying off the display area, important contents are displayed, and unimportant contents are not allowed to be displayed.

As described above, in the display control processing according to the first embodiment, of the contents lying off the display area, unimportant contents are not allowed to be displayed, and only the important contents and the contents within the display area are displayed. Consequently, desirable contents are allowed to be displayed, and a task may be smoothly performed as well as the volume of data to be displayed may be reduced.

Also, it is possible to display desirable contents on the HMD 10 by only performing detection of an AR marker, and processing of identification of content information corresponding to the AR marker and the coordinates of the display position. Thus, the power consumption time is reduced. Consequently, it is possible to reduce the power used for display of contents corresponding to an AR marker, and to simplify the operation for displaying the contents corresponding to the AR marker.

Second Embodiment

[Functional Configuration]

Figure 9:
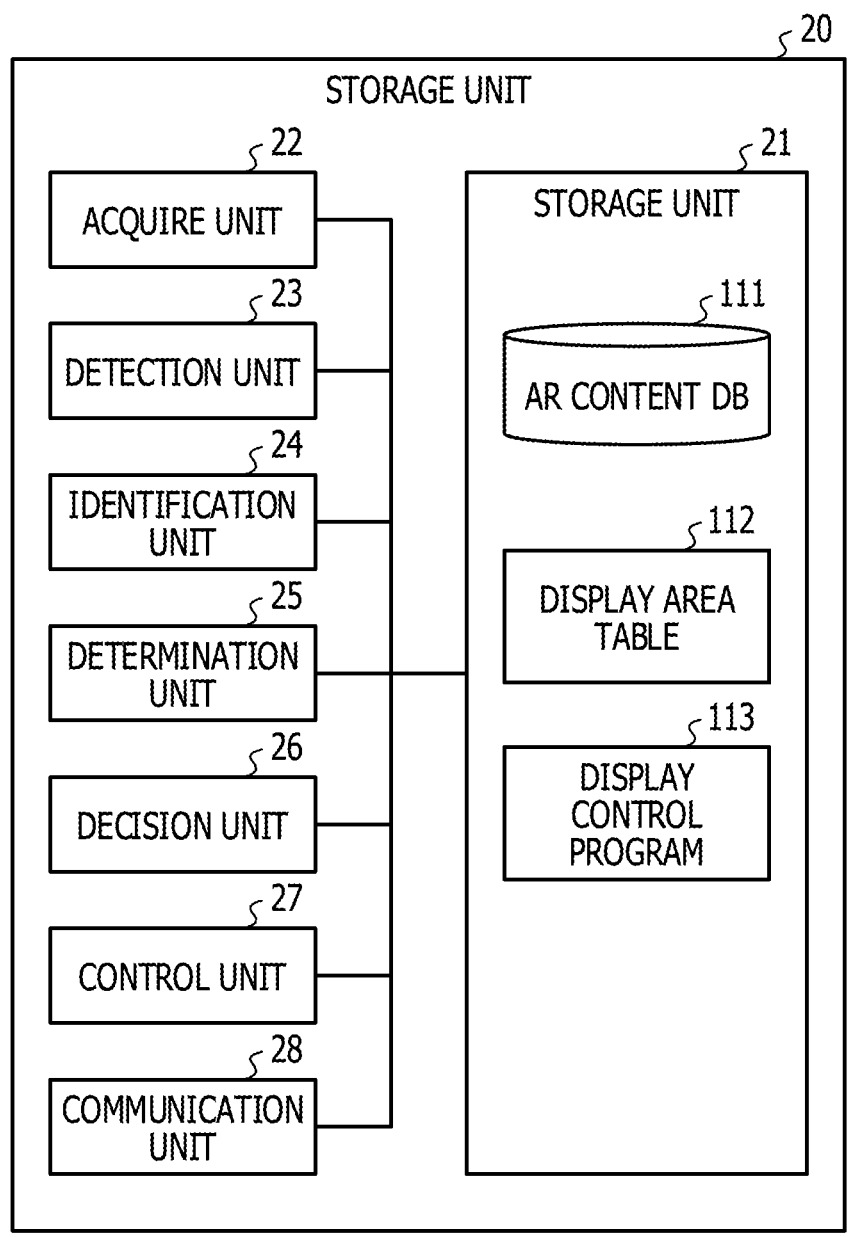
FIG. 9 is a diagram illustrating an example functional configuration of a server according to a second embodiment.

Next, an example of the functional configuration of a server 20 according to a second embodiment will be described with reference to FIG. 9. FIG. 9 is a diagram illustrating an example functional configuration of the server 20 according to the second embodiment. The functional configuration of the server 20 according to the second embodiment differs from that of the first embodiment only in that the storage unit 21 of the server 20 according to the first embodiment of FIG. 4 further stores a display area table 112.

FIG. 10 illustrates an example of the display area table 112 according to the second embodiment. The display area table 112 stores the upper left coordinates and the lower right coordinates of the range of the area of each one of multiple rectangular areas into which the display area of the display 11 is divided.

[Display Control Processing]

Figure 11:
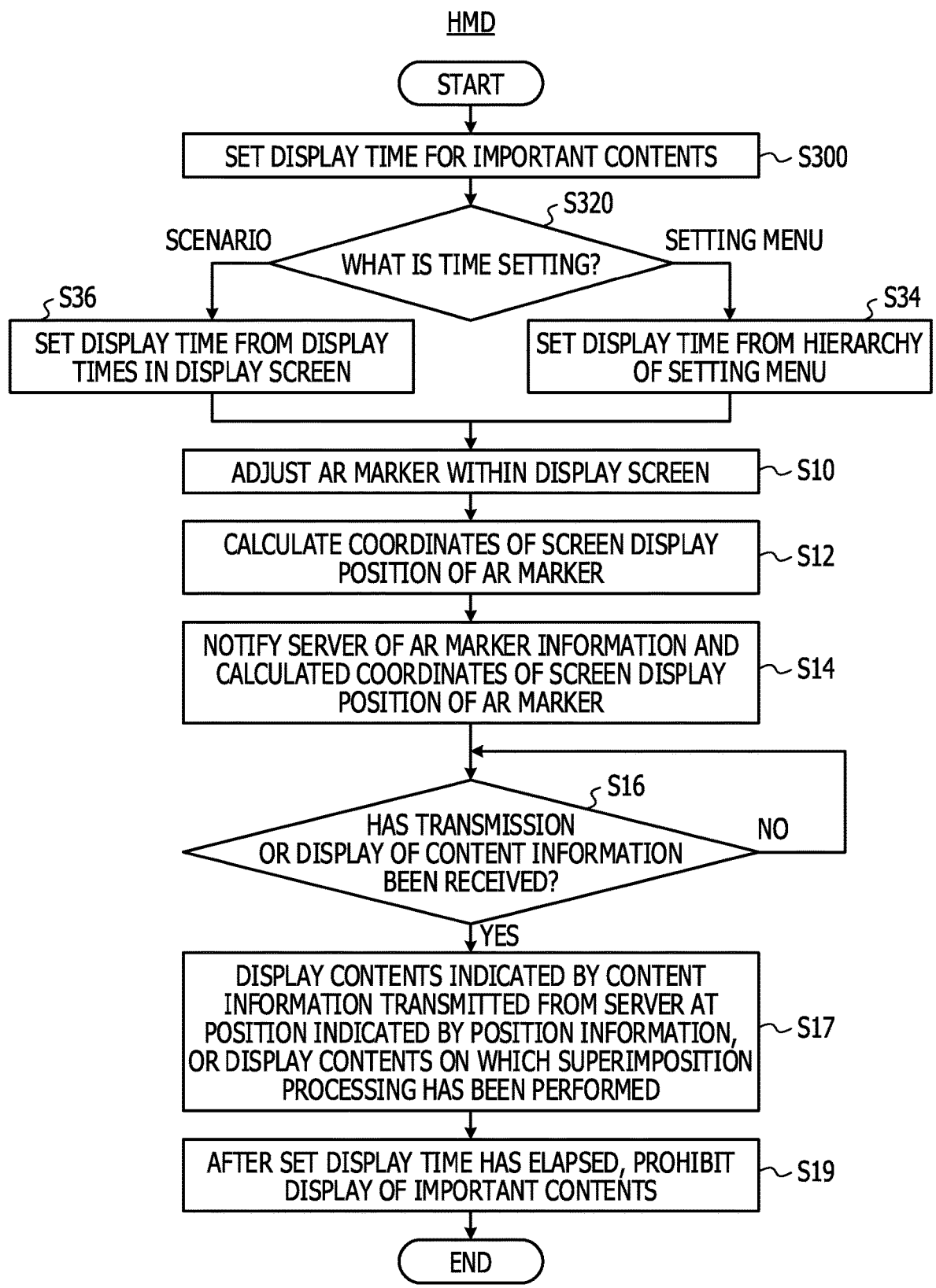
FIG. 11 is a flowchart illustrating an example of display control processing (on HMD side) according to the second embodiment.
Figure 12:
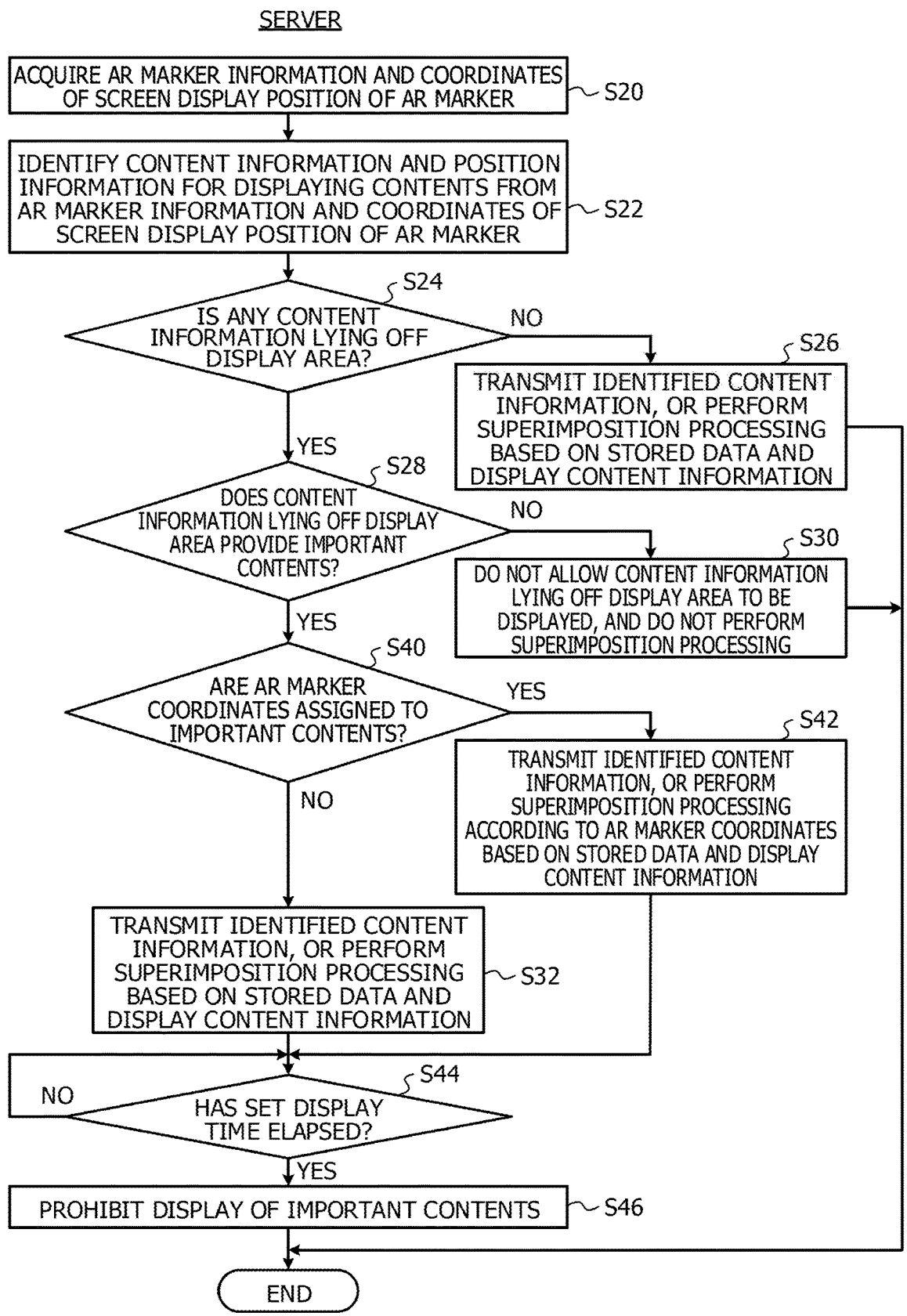
FIG. 12 is a flowchart illustrating an example of display control processing (on server side) according to the second embodiment.

Next, an example of the display control processing according to the second embodiment will be described with reference to FIGS. 11 and 12. FIG. 11 is a flowchart illustrating an example of the display control processing (on the HMD side) according to the second embodiment. FIG. 12 is a flowchart illustrating an example of the display control processing (on the server side) according to the second embodiment. A step for performing processing in the steps illustrated in FIG. 11, and a step for performing the same processing in the display control processing (on the HMD side) according to the first embodiment of FIG. 6 are labeled with the same step number. Also, a step for performing processing in the steps illustrated in FIG. 12, and a step for performing the same processing in the display control processing (on the server side) according to the first embodiment of FIG. 7 are labeled with the same step number.

It is to be noted that the display control processing according to the second embodiment illustrated in FIGS. 11 and 12 is started after the display control processing according to the first embodiment illustrated in FIGS. 6 and 7 is performed by each of the HMD 10 and the server 20.

When the display control processing on the HMD 10 side in FIG. 11 is started, the control unit 27 sets a display time for important contents (step S300). At this point, when time setting is "setting menu" (step S320), the control unit 27 sets a display time selected from the hierarchy of the setting menu by a worker (step S34). When time setting is "scenario" (step S32), the control unit 27 sets a display time selected from the display times in the display screen by a worker (step S36).

Next, the camera 12 adjusts the AR marker within the display screen (step S10). The HMD 10 calculates the coordinates of the screen display position of the AR marker (step S12), and notifies the server 20 of AR marker information and the calculated coordinates of the screen display position of the AR marker (step S14).

In the server 20, as illustrated in FIG. 12, the acquisition unit 22 receives information from the HMD 10 (step S20). When the detection unit 23 detects AR marker Ar based on the received information, the identification unit 24 refers to the AR content DB 111, and identifies content information associated with the AR marker Ar and position information for displaying the contents (step S22).

Next, when the determination unit 25 determines that no content information lies off the display area of the display 11 (step S24), the decision unit 26 transmits the identified content information, or performs superimposition processing based on stored data, and displays the content information (step S26).

On the other hand, when determining that some content information lies off the display area of the display 11, the determination unit 25 determines whether or not the content information lying off the display area provides important contents (step S28). When the determination unit 25 determines that the content information lying off the display area provide unimportant contents, the decision unit 26 does not allow the content information lying off the display area to be displayed, and does not perform superimposition processing (step S30).

In step S28, when determining that some content information lying off the display area provides important contents, the determination unit 25 determines whether or not AR marker coordinates are assigned to the determined important content information (step S40). When the determination unit 25 determines that AR marker coordinates are not assigned to the determined important content information, the decision unit 26 transmits the identified content information to the HMD 10, or performs superimposition processing based on stored data, and displays the content information (step S32).

On the other hand, when the determination unit 25 determines in step S40 that AR marker coordinates are assigned to the determined important content information, the decision unit 26 transmits the identified content information, or performs superimposition processing according to the AR marker coordinates based on stored data, and displays the content information (step S42). When the identified content information is transmitted, superimposition processing is performed according to the AR marker coordinates on the HMD 10 side.

Returning to FIG. 11, the HMD 10 determines whether transmission or display of the content information has been received from the server 20 (step S16). When transmission or display of the content information has been received from the server 20, the contents indicated by the content information transmitted from the server 20 at the position indicated by the position information, or the contents on which superimposition processing has been performed are displayed (step S17). The decision unit 26 prohibits display of important contents in which a display time has elapsed (step S19), and completes the processing.

Figure 13:
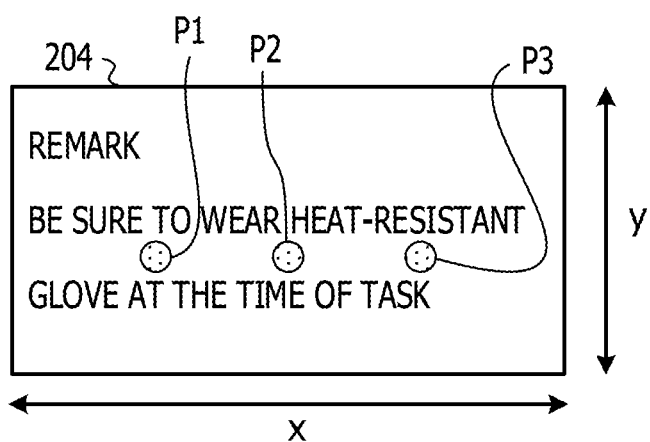
FIG. 13 is a display illustrating an example of multiple reference coordinates defined on important contents according to the second embodiment.

For instance, FIG. 13 illustrates an example in which AR marker coordinates P1, P2, and P3 are assigned to important content 204. The AR marker coordinates P1, P2, and P3 are an example of multiple reference coordinates assigned to the important content 204. In the example of FIG. 13, when the width of the contents in the x direction is greater than the width of the contents in the y direction, AR marker coordinates P1 are (x/3, y/2), AR marker coordinates P2 are (x/2, y/2), and AR marker coordinates P3 are (2x/3, y/2). It is to be noted that the AR marker coordinates P1, P2, and P3 are an example of multiple reference positions pre-assigned to contents, and the number of AR marker coordinates is not limited to three, and may be two or greater.

Figure 14A:
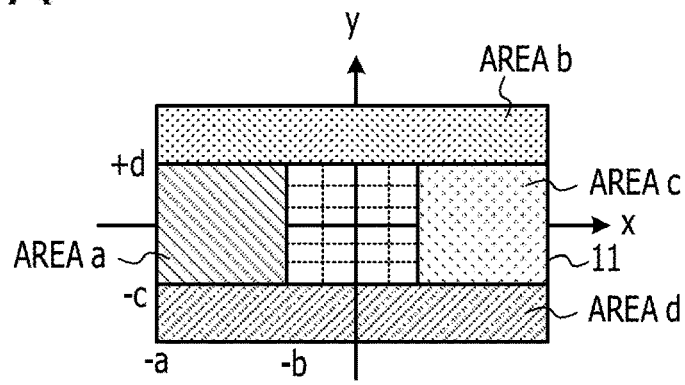
FIGS. 14A, 14B, 14C, and 14D are each an illustration depicting an example display area according to the second embodiment.
Figure 14B:
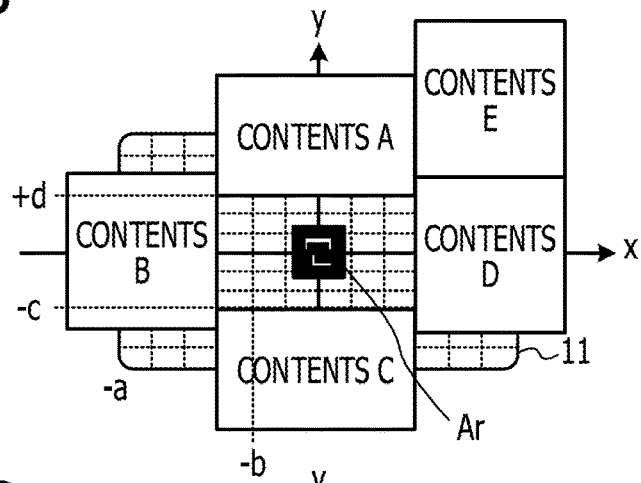
Figure 14C:
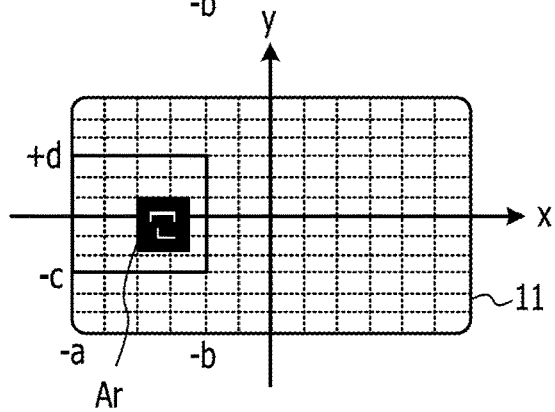

Lastly, the superimposition processing of contents performed by the server 20 or the HMD 10, and a specific example of the display control processing with AR marker coordinates P1, P2, and P3 assigned to the important content 204 will be described with reference to FIGS. 14 to 16. In the example illustrated in FIG. 14A, the display area of the display 11 is divided into areas a to d based on the display area table 112. For instance, when it is assumed that the AR marker Ar is at a central position of the display area as illustrated in FIG. 14B, for the AR marker Ar, each of contents A to E is displayed superimposed on one of divided areas. The display positions of the contents A to E for the AR marker Ar are defined based on the AR content DB 111.

The determination unit 25 calculates the center coordinates of the AR marker from the size detected actual AR marker, and determines the calculated center coordinates are in which one of divided areas of the display area. In the example illustrated in FIG. 14C, for calculated center coordinates $(x, y)$, the x-coordinate satisfies $-a<x<-b$, and the y-coordinate satisfies $-c<y<+d$, thus the determination unit 25 determines that the AR marker Ar is in the area a. When the AR marker Ar is placed at the position, it is determined that only the content D does not lie off the display area. Thus, the decision unit 26 performs superimposition processing on the content D at the defined display position, and displays the content D. It is to be noted that the calculated center coordinates (x, y) is an example of identified position of a reference object (AR marker Ar).

Figure 14D:
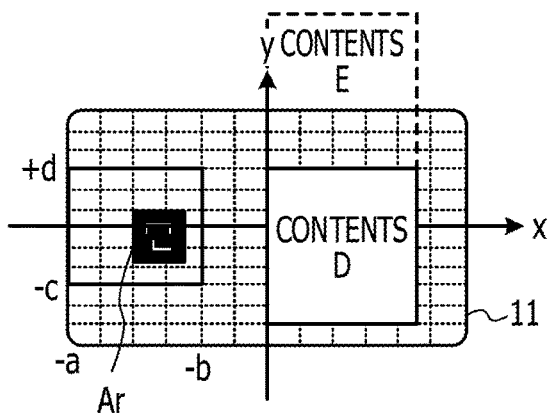

Of the contents A to C, and E lying off the display area, the decision unit 26 disallows, and prohibits display of unimportant contents A to C. In contrast, the content E may be determined to be important from the important degree information 117 of the AR content DB 111. Thus, as illustrated in FIG. 14D, for the AR marker Ar, the decision unit 26 performs superimposition processing on the contents D, E at the defined display position, and displays the contents D, E. It is to be noted that the superimposition processing for contents described above with reference to FIG. 14 is performed in the first and second embodiments.

Figure 15A:
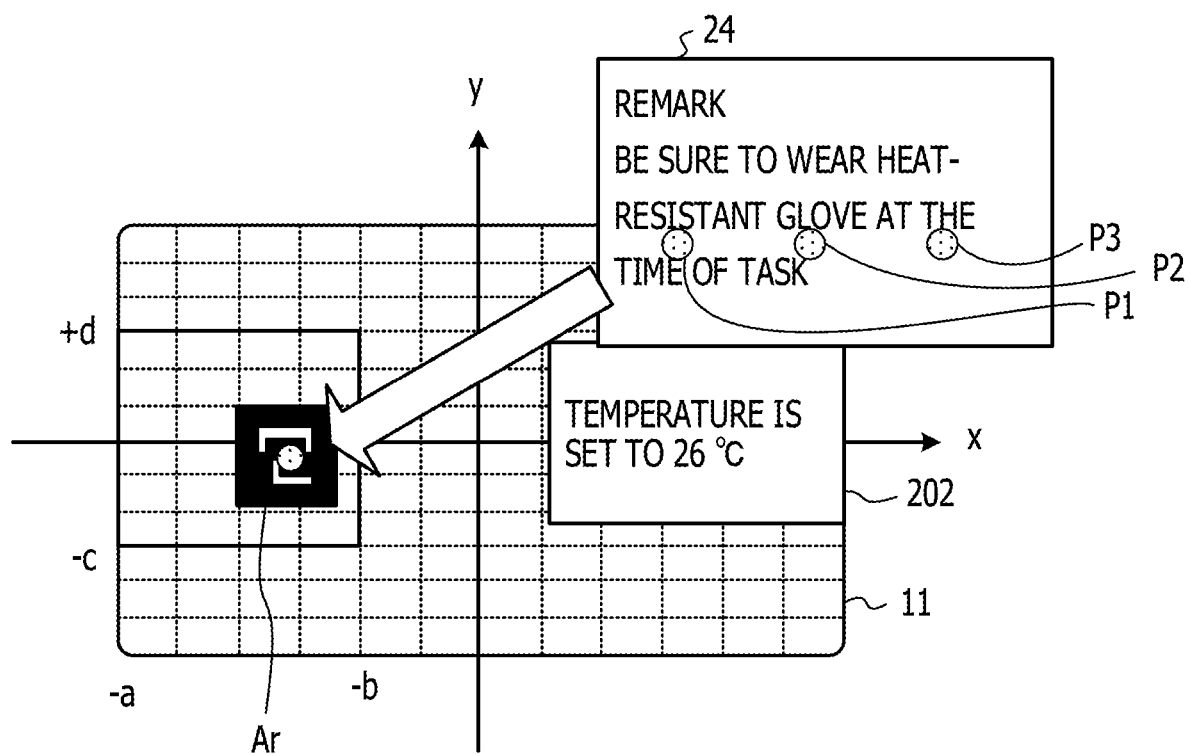
FIGS. 15A, 15B, 15C, and 15D are each an illustration depicting a display example of the display control processing according to the second embodiment.
Figure 15B:
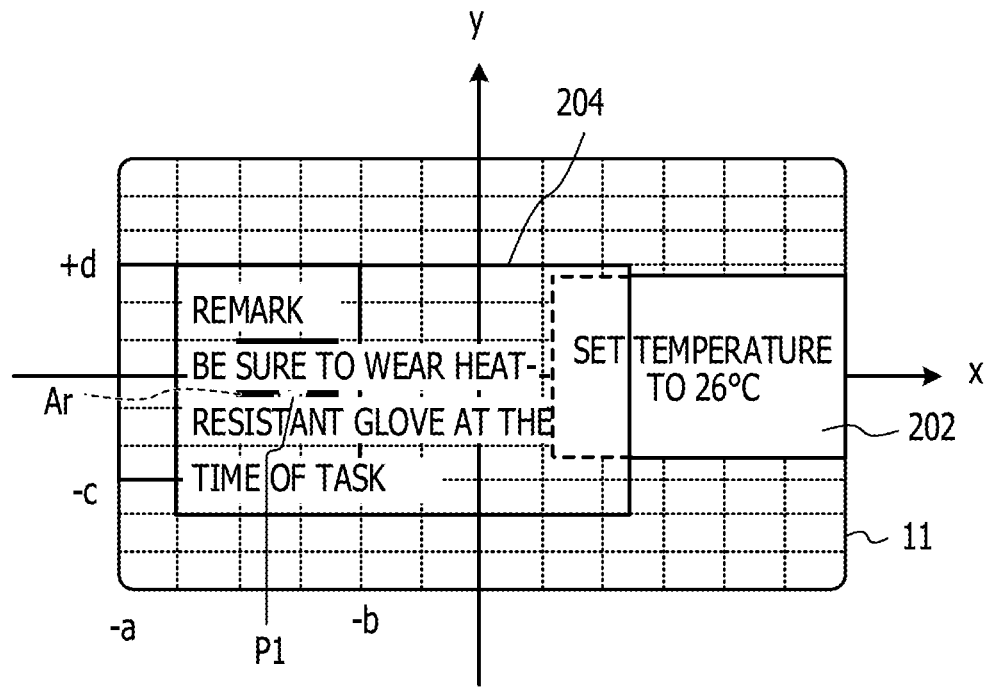
Figure 15C:
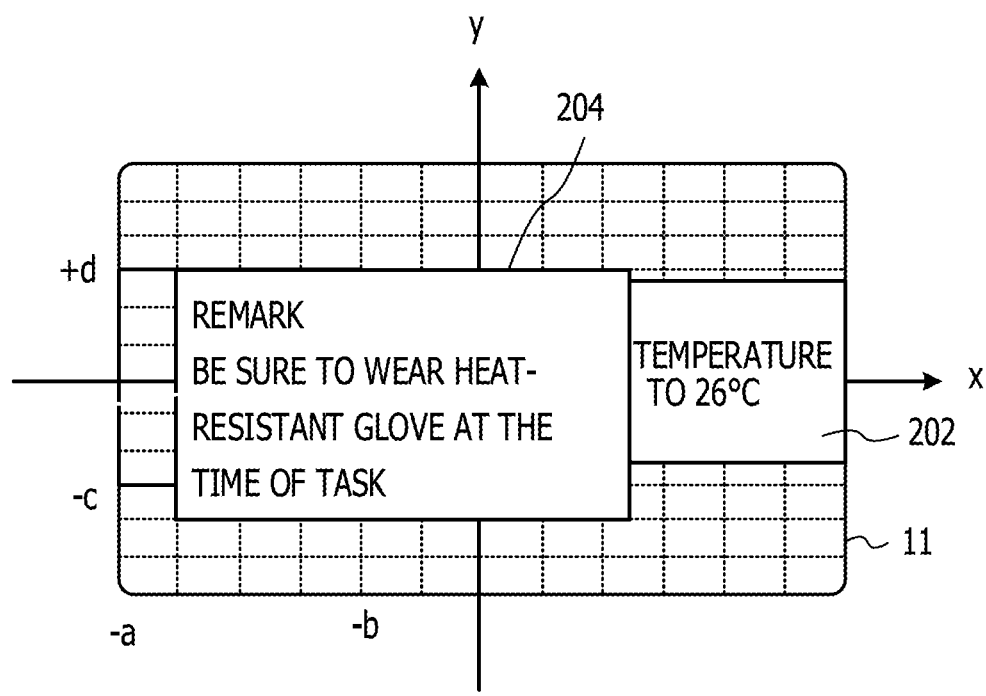
Figure 15D:
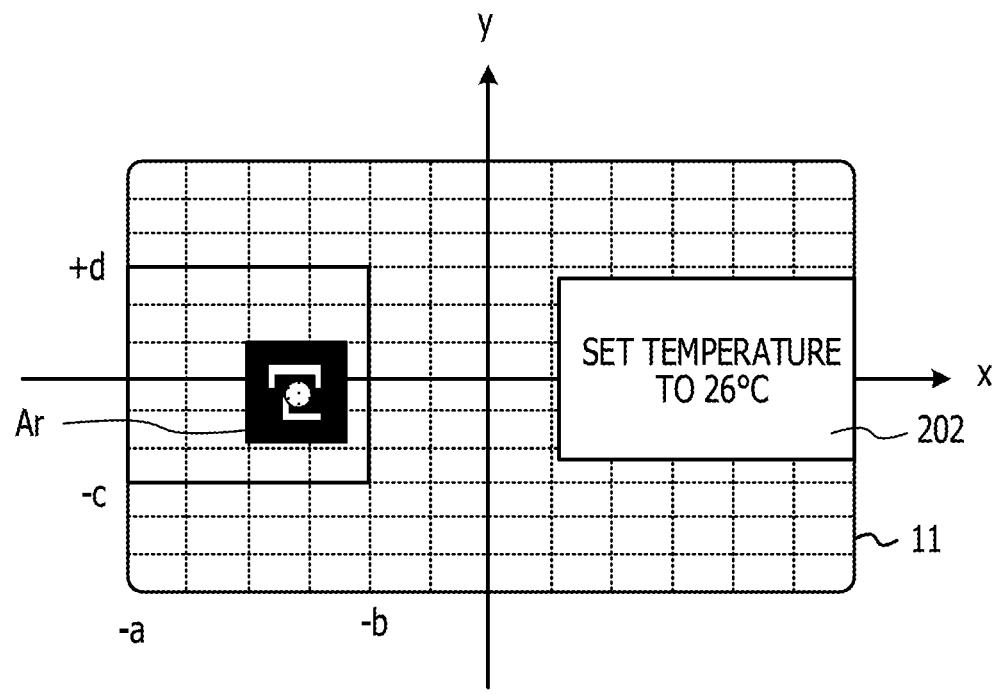

Next, the superimposition processing in the second embodiment will be further described. Here, the superimposition processing and display of an important content will be described with reference to FIG. 15 in which the important content 204 of FIG. 13 is applied to an important content E. As illustrated in FIG. 15A, the decision unit 26 adjusts each of the AR marker coordinates P1, P2, and P3 to the center coordinates of the AR marker, and calculates coordinates which allow the entire important content 204 to be displayed in the display area, and performs superimposition display. In this example, as illustrated in FIG. 15B, when the AR marker coordinates P1 (x/3, y/2) are adjusted to the center coordinates of the AR marker, it is possible to display the entire important content 204 in the display area. Thus, as illustrated in FIG. 15C, the decision unit 26 adjusts the AR marker coordinates P1 (x/3, y/2) to the center coordinates of the AR marker, and performs superimposition processing on the important content 204 and displays the important content 204. Subsequently, after the display time elapses, the decision unit 26 prohibits display of the important content 204 as illustrated in FIG. 15D.

FIG. 16 illustrates an example of superimposition display when each of the AR marker coordinates P1, P2, and P3 is adjusted to the center coordinates of the AR marker Ar. FIG. 16A illustrates a display example of the important content 204 when the AR marker coordinates P1 is adjusted to the center coordinates of the AR marker Ar. FIG. 16B illustrates a display example of the important content 204 when the AR marker coordinates P3 is adjusted to the center coordinates of the AR marker Ar. FIGS. 16C and 16D illustrate a display example of the important content 204 when the AR marker coordinates P2 is adjusted to the center coordinates of the AR marker Ar. In this manner, it is possible to display the entire content 204 by appropriately selecting one of the AR marker coordinates P1, P2, and P3 of the content 204 according to the display position of the AR marker Ar.

With the display control processing according to the second embodiment, in addition to the effect of the display control processing according to the first embodiment, it is possible to display an important content at a position which allows the entire content to be displayed. However, when an important content is displayed for an indefinite period of time at a position which makes it difficult to view an actual task situation, the display interferes with a smooth task. Thus, a display time for an important content is preset, and an important content in which the set display time has elapsed is prohibited from being displayed. Thus, after the entire important content is displayed for just the set display time, the important content is prohibited from being displayed, thereby making it possible to achieve further increase in efficiency of the task.

Although the display control program, the display control method, and the display control device have been described using the embodiments above, the display control program, the display control method, and the display control device according to the present disclosure are not limited to the embodiments, and various modifications and improvements may be made within the range of the present disclosure. Also, when the embodiments and modifications are present in multiple numbers, they may be combined in a range without inconsistency.

For instance, in the embodiments, as one of methods of "performing superimposition processing based on stored data according to AR marker coordinates and displaying content", a method may be adopted in which the HMD 10 illustrated in FIG. 3 is provided with the functions of the acquisition unit 22 and the detection unit 23, and processing is performed in the HMD 10 without communicating with the server 20. In this case, the AR content DB 111 is stored in the memory 14 of FIG. 3, an image, which is captured by the camera 12 and includes the AR marker Ar, is acquired by the acquisition unit 22, AR marker Ar is detected by the detection unit 23, and a content is superimposed based on the AR content DB 111 stored in the memory 14.

As another method, after an AR marker Ar is detected, when content information is received from the server 20, a content is superimposed and at the same time, content data information is stored in the memory 14 (downloaded from the server 20).

In addition, when the HMD 10 illustrated in FIG. 3 is provided with the functions of the acquisition unit 22 and the detection unit 23, a method may be adopted in which although content information is received from the server 20 and superimposed, and at the second time or later, AR marker Ar is acquired and detected in the HMD 10, and when AR marker information is present in the AR content DB 111 stored in the memory 14, a content is superimposed without communicating with the server 20.

In the second embodiment, after an important content is displayed for just the set display time, processing of prohibiting display may be applied to the first embodiment. Also, in the first and second embodiments, after an important content is displayed for just the set display time, only a display time is displayed instead of prohibiting display, then the display position of the important content may be returned to the original display position. The original display position is the position indicated by the position information 116 which is set corresponding to the content information 115 of important contents in the AR content DB 111.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus configured to execute an augmented reality (AR) processing, the information processing apparatus comprising:
   a display device; and a processor coupled to the display device and configured to:
acquire image data; detect an AR marker included in the image data;
identify a content corresponding to the AR marker, and position information indicating a display position of the content in the display device;
determine, based on the content and the position information, whether a part of the content is not within a display area of the display device;
when it is determined that the part of the content is not within a display area of the display device, determine, based on attribute information of the content, whether the part of the content is to be displayed on the display device; and
when it is determined that the content is to be displayed on the display device, display the content including the part of the content on the display device.

2. The information processing apparatus according to claim 1, wherein the attribute information indicates an important degree related to display, and the processor is configured to:
when it is determined that the part of the content is not to be disposed within the display device and the important degree of the content satisfies a reference value, display the content on the display device; and
when it is determined that the part of the content is not to be disposed within the display device and the important degree of the content does not satisfy the reference value, not display the content on the display device.

3. The information processing apparatus according to claim 2, wherein the processor is configured to:
when the important degree of the content satisfies the reference value and a plurality of positions are indicated as the display position of the content by the position information, display the content at a first position of the plurality of positions so that whole of the content is displayed on the display device.

4. The information processing apparatus according to claim 2, wherein the processor is configured to:
when the important degree of the content satisfies the reference value, not display the content on the display device after the content is displayed on the display device for a certain time.

5. The information processing apparatus according to claim 2, wherein the processor is configured to:
when the important degree of the content satisfies the reference value, display the content at a position different from the display position indicated by the position information so that whole of the content is displayed on the display device.

6. A non-transitory computer-readable storage medium storing a program that causes an information processing apparatus to execute a process, the information processing apparatus configured to execute an augmented reality (AR) processing, the process comprising:
acquiring image data; detecting an AR marker included in the image data; identifying a content corresponding to the AR marker, and position information indicating a display position of the content in a display device;
determining, based on the content and the position information, whether a part of the content is not within a display area of the display device;
when it is determined that the part of the content is not within a display area of the display device, determining, based on attribute information of the content, whether the part of the content is to be displayed on the display device; and
when it is determined that the content is to be displayed on the display device, displaying the content including the part of the content on the display device.

7. The non-transitory computer-readable storage medium according to claim 6, wherein the attribute information indicates an important degree related to display, when it is determined that the part of the content is not to be disposed within the display device and the important degree of the content satisfies a reference value, the content is displayed on the display device, and when it is determined that the part of the content is not to be disposed within the display device and the important degree of the content does not satisfy the reference value, the content is not displayed on the display device.

8. The non-transitory computer-readable storage medium according to claim 7, wherein when the important degree of the content satisfies the reference value and a plurality of positions are indicated as the display position of the content by the position information, the content is displayed at a first position of the plurality of positions so that whole of the content is displayed on the display device.

9. The non-transitory computer-readable storage medium according to claim 7, wherein when the important degree of the content satisfies the reference value, the content is not displayed on the display device after the content is displayed on the display device for a certain time.

10. The non-transitory computer-readable storage medium according to claim 7, wherein when the important degree of the content satisfies the reference value, the content is displayed at a position different from the display position indicated by the position information so that whole of the content is displayed on the display device.

* * * * *